United States Patent
Bavishi

(10) Patent No.: US 11,106,609 B2
(45) Date of Patent: Aug. 31, 2021

(54) PRIORITY SCHEDULING IN QUEUES TO ACCESS CACHE DATA IN A MEMORY SUB-SYSTEM

(71) Applicant: Micron Technology, Inc., Boise, ID (US)

(72) Inventor: Dhawal Bavishi, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/289,478

(22) Filed: Feb. 28, 2019

(65) Prior Publication Data

US 2020/0278941 A1    Sep. 3, 2020

(51) Int. Cl.
*G06F 13/18* (2006.01)
*G06F 3/06* (2006.01)
*G06F 12/0868* (2016.01)
*G06F 13/16* (2006.01)

(52) U.S. Cl.
CPC ............ *G06F 13/18* (2013.01); *G06F 3/0611* (2013.01); *G06F 3/0659* (2013.01); *G06F 3/0679* (2013.01); *G06F 12/0868* (2013.01); *G06F 13/161* (2013.01); *G06F 13/1642* (2013.01)

(58) Field of Classification Search
None
See application file for complete search history.

(56) References Cited

U.S. PATENT DOCUMENTS

| | | | |
|---|---|---|---|
| 5,671,444 A | 9/1997 | Akkary et al. | |
| 6,378,047 B1 | 4/2002 | Meyer | |
| 6,499,090 B1 * | 12/2002 | Hill | G06F 13/1642 710/309 |
| 7,493,450 B2 | 2/2009 | Bearden | |
| 8,429,351 B1 | 4/2013 | Yu et al. | |
| 9,639,466 B2 * | 5/2017 | Robertson | G06F 12/084 |
| 10,387,329 B2 * | 8/2019 | Chang | G06F 3/0665 |

(Continued)

FOREIGN PATENT DOCUMENTS

| | | |
|---|---|---|
| KR | 10-2014-000733 A | 1/2014 |
| KR | 10-2015-0079429 A | 7/2015 |

(Continued)

OTHER PUBLICATIONS

International Search Report and Written Opinion for International Application No. PCT/US2020/01991, dated Jun. 19, 2020, 11 pages.

(Continued)

*Primary Examiner* — Denise Tran
(74) *Attorney, Agent, or Firm* — Lowenstein Sandler LLP

(57) ABSTRACT

A request to read data stored at a memory sub-system can be received. A determination can be made of whether the data is stored at a cache of the memory sub-system. Responsive to determining that the data is not stored at the cache of the memory sub-system, the data can be obtained from a memory component of the memory sub-system. A first priority indicator can be assigned to a fill operation associated with the data that is obtained from the memory component. A second priority indicator can be assigned to the request to read the data. A schedule of executing the fill operation and the request to read the data can be determined based on the first priority indicator and the second priority indicator.

19 Claims, 12 Drawing Sheets

(56) References Cited

U.S. PATENT DOCUMENTS

| | | |
|---|---|---|
| 2003/0093636 A1* | 5/2003 | Henry ................ G06F 12/0802 711/158 |
| 2004/0054853 A1 | 3/2004 | Sprangle et al. |
| 2004/0128452 A1 | 7/2004 | Schmisseur et al. |
| 2004/0205296 A1 | 10/2004 | Bearden |
| 2005/0044317 A1 | 2/2005 | Rivers |
| 2005/0268051 A1 | 12/2005 | Hill et al. |
| 2006/0218352 A1 | 9/2006 | Shannon et al. |
| 2007/0067572 A1 | 3/2007 | Jiao et al. |
| 2007/0174599 A1 | 7/2007 | Dowling |
| 2008/0022045 A1 | 1/2008 | Ali et al. |
| 2011/0225369 A1 | 9/2011 | Park et al. |
| 2013/0111136 A1 | 5/2013 | Bell, Jr. et al. |
| 2014/0040552 A1 | 2/2014 | Rychlik et al. |
| 2015/0012705 A1 | 1/2015 | Holmqvist et al. |
| 2015/0026404 A1 | 1/2015 | Lilly et al. |
| 2015/0046649 A1 | 2/2015 | Benhase et al. |
| 2015/0309933 A1 | 10/2015 | Nellans et al. |
| 2016/0041773 A1 | 2/2016 | Phan |
| 2016/0062651 A1 | 3/2016 | Hineman et al. |
| 2018/0095756 A1 | 4/2018 | Hasenplaugh et al. |
| 2018/0121360 A1 | 5/2018 | Chen |
| 2018/0300929 A1 | 10/2018 | Appu et al. |
| 2019/0004967 A1* | 1/2019 | Chachad ................ H03K 21/00 |

FOREIGN PATENT DOCUMENTS

| | | |
|---|---|---|
| KR | 10-2017-0138765 A | 12/2017 |
| KR | 10-2018-0078253 A | 7/2018 |

OTHER PUBLICATIONS

International Search Report and Written Opinion for International Application No. PCT/US2020/020211, dated Jun. 23, 2020, 11 pages.

International Search Report and Written Opinion for International Application No. PCT/US2020/020289, dated Jun. 23, 2020, 11 pages.

International Search Report and Written Opinion for International Application No. PCT/US2020/020294, dated Jun. 26, 2020, 11 pages.

* cited by examiner

Write-read outstanding command queues 210

| tag | qc | reqs | E c,v | WB c,v |
|-----|----|----|----|----|
| | | | | |
| | | | | |
| | | | | |

Read-only outstanding command queues 208

| tag | qc | reqs | R c,v | F c,v |
|-----|----|----|----|----|
| | | | | |
| | | | | |
| | | | | |

Write-read CAM 206

| tag | v[] sectors | D[] sectors | address |
|-----|----|----|----|
| | 0000_0000 | 0000_0000 | |
| | | | |
| | | | |

Read-only CAM 204

| tag | v | D[] sectors | address |
|-----|----|----|----|
| | 00 | 00 | |
| | 11 | 00 | |
| | | | |

FIG. 8

PRIORITY SCHEDULING IN QUEUES TO ACCESS CACHE DATA IN A MEMORY SUB-SYSTEM

TECHNICAL FIELD

Embodiments of the disclosure relate generally to memory sub-systems, and more specifically, relate to priority scheduling in queues to access cache data in a memory sub-system.

BACKGROUND

A memory sub-system can be a storage system, such as a solid-state drive (SSD), or a hard disk drive (HDD). A memory sub-system can be a memory module, such as a dual in-line memory module (DIMM), a small outline DIMM (SO-DIMM), or a non-volatile dual in-line memory module (NVDIMM). A memory sub-system can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

FIG. 8 illustrates an example read-only outstanding command queues, write-read outstanding command queues, a read-only content-addressable memory, and a read-only content-addressable memory in accordance with some embodiments of the present disclosure.

DETAILED DESCRIPTION

Figure 1:
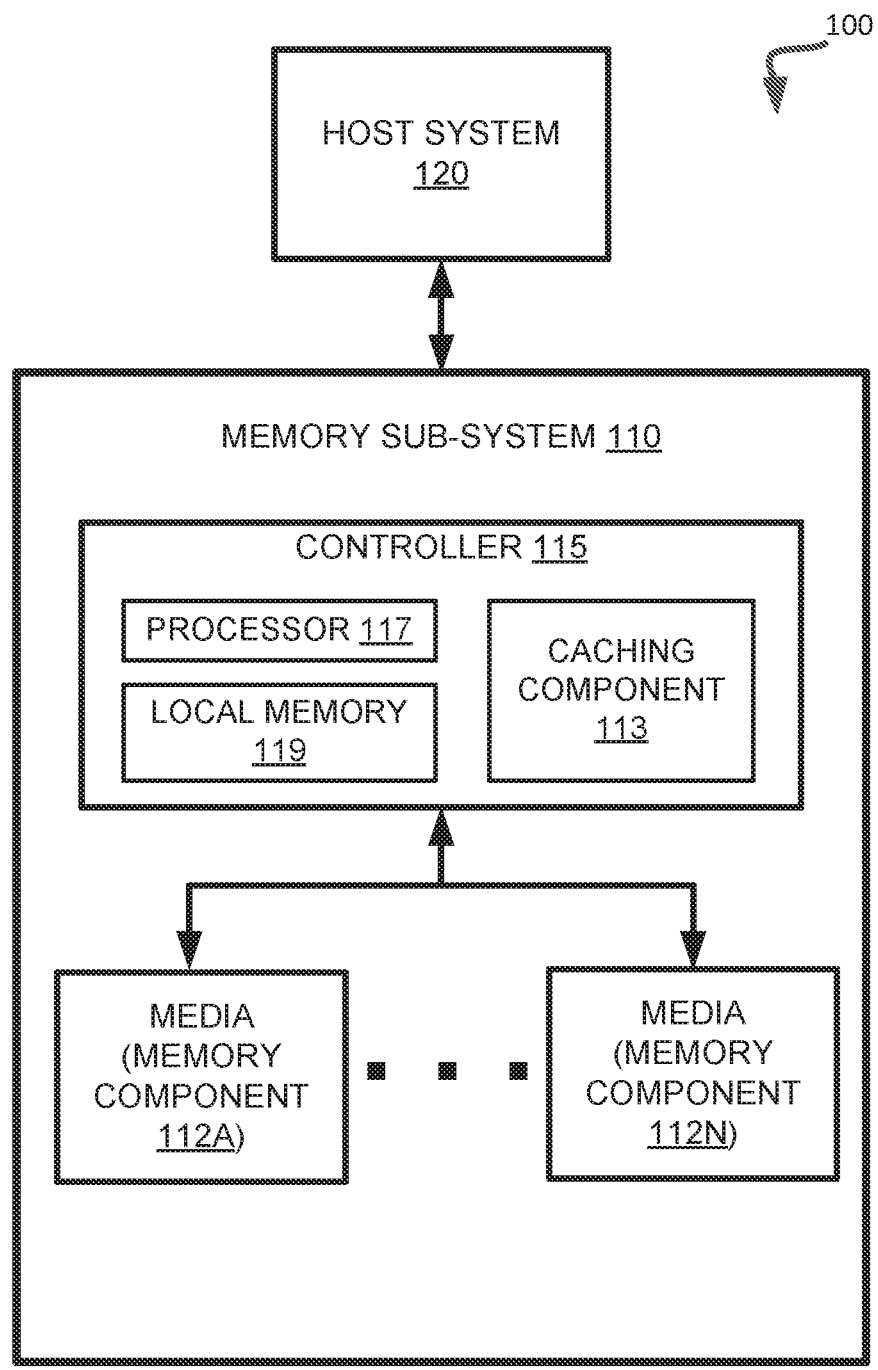
FIG. 1 illustrates an example computing environment that includes a memory sub-system in accordance with some embodiments of the present disclosure.

Aspects of the present disclosure are directed to priority scheduling in queues to access cache data in a memory sub-system. A memory sub-system is also hereinafter referred to as a "memory device." An example of a memory sub-system is a storage device that is coupled to a central processing unit (CPU) via a peripheral interconnect (e.g., an input/output bus, a storage area network). Examples of storage devices include a solid-state drive (SSD), a flash drive, a universal serial bus (USB) flash drive, and a hard disk drive (HDD). Another example of a memory sub-system is a memory module that is coupled to the CPU via a memory bus. Examples of memory modules include a dual in-line memory module (DIMM), a small outline DIMM (SO-DIMM), a non-volatile dual in-line memory module (NVDIMM), etc. In some embodiments, the memory sub-system can be a hybrid memory/storage sub-system. In general, a host system can utilize a memory sub-system that includes one or more memory components. The host system can provide data to be stored at the memory sub-system and can request data to be retrieved from the memory sub-system.

The memory sub-system can include multiple memory components that can store data from the host system. In some host systems, the performance of applications executing on the host system can highly depend on the speed at which data can be accessed in a memory sub-system. To accelerate data access, conventional memory sub-systems use spatial and temporal locality of memory access patterns to optimize performance. These memory sub-systems can use higher performance and lower capacity media, referred to as caches, to store data that is accessed frequently (temporal locality) or data located in a memory region that has recently been accessed (spatial locality).

Each of the memory components can be associated with a protocol that specifies the size of a management unit used by the memory component and/or the preferred sizes for requests to access data stored at the management unit. For example, a protocol for one memory component can specify that 512 kilobyte (KB) size requests be performed on the memory component. An application executing on a host system can initially request to read 512 KB of data from the memory component, but the 512 KB request is typically broken up into smaller granularity requests (e.g., eight 64 KB requests) due to a protocol of a bus used to communicate between the host system and the memory sub-system. The conventional memory sub-system can perform the smaller granularity requests to obtain the data from the memory component, which can then be stored in a cache, and/or returned to the requesting application. Executing the smaller granularity requests on a memory component that is capable of handling larger granularity requests can lead to faster wear of the memory component and a lower endurance as more read operations will be performed at the memory component.

Additionally, some applications that execute on a host system can use a memory sub-system as a main memory. In such an instance, the address space generally has separate memory address regions for reading data and writing data. In conventional memory sub-systems, a single cache that is capable of writing and reading data can be used, which may not be desirable for different memory access workloads. For example, the read and write request latencies can be different and using a single cache can decrease performance of the memory sub-system when an application is writing and reading to different address spaces.

The different types of memory access workloads can be sequential (in-order) and random (out-of-order) accesses. For example, an application can request to read original data from an address, write different data to the address, and read the different data from the address. If the requests are not handled in order properly, there can be data hazards such as the memory sub-system returning the wrong data to the application (e.g., returning the original data in response to a read request for the different data before the different data has been written).

Further, in some instances, applications can request to access data at different addresses. The data can be located at the same or different memory components. The latency with returning the data at different addresses from the same or different memory components can vary based on various factors, such as the speed of the memory component, the size of the data requested, and the like. A conventional memory sub-system typically waits until the data at the address of a request that was received first is returned from the memory components without considering whether data at a different address of another request is returned from the memory components faster. That is, the data at the different address can sit idle after being returned from the memory components until the data at the address of the request received first is stored in a cache. This can reduce data throughput in the memory sub-system.

Aspects of the present disclosure address the above and other deficiencies by using a separate read-only cache and write-read cache in a memory sub-system. A separate read-only cache and write-read cache in a memory sub-system front-end can provide applications executing on host systems different spaces to read from and write to. For example, applications can request certain virtual addresses that are translated to logical addresses by a host operating system. The logical address can be translated to a physical address that can be maintained in different spaces to read from and write to using the separate read-only cache and write-read cache. The separate read-only and write-read caches can be located between the host system and the media components, also referred to as a "backing store," of the memory sub-system. The read-only cache can be used for sequential read requests for data in the memory components and the write-read cache can be used to handle read and write requests for data in the media components. The separate caches can improve performance of the memory sub-system by reading/writing data faster than accessing the slower backing store for every request. Further, the separate caches improve endurance of the backing store by reducing the number of requests to the backing store.

In some embodiments, a memory sub-system can detect a memory access workload, such as sequential memory access workloads or random memory access workloads. Sequential memory access workloads can refer to read requests occurring one after the other to the same or sequential addresses. The data requested in the sequential memory access workloads can be populated in the read-only cache for faster access than using the backing store every time.

Random memory access workloads can refer to writes and reads occurring randomly. Certain applications can use random memory access workloads. The data associated with the random write and read requests can be populated in the write-read cache. For example, data requested to be written to the backing store can be initially written to the write-read cache, when the data is requested to be read, the write-read cache can return the written data without having to access the backing store.

Each of the read-only cache and the write-read cache can use a respective content-addressable memory (CAM) to determine if data that is associated with requests received from the host system are present in the read-only cache and/or the write-read cache. For example, the memory sub-system can use the CAMs to determine whether requested data including tags are stored in the read-only and/or write-read caches. A data request has an address specifying the location of the requested data. The address can be broken up into portions, such as an offset that identifies a particular location within a cache line, a set that identifies the set that contains the requested data, and a tag that includes one or more bits of the address that can be saved in each cache line with its data to distinguish different addresses that can be placed in a set. The CAM corresponding to the read-only cache or the write-read cache that are to store the requested data can store the tag for the requested data to enable faster lookup than searching the cache itself when the requests are received.

Further, as discussed above, the host system can provide a request for data (e.g., 512 bytes) by breaking the request into small granularity requests of 64 bytes based on the protocol used by a memory bus that communicatively couples the host system to the memory sub-system. In some embodiments, each of the read-only cache and the write-read cache use sectors to aggregate the smaller granularity requests to a larger granularity of the cache line (e.g., aggregates eight 64 bytes requests to achieve the 512 byte cache line size). The sectors can have a fixed size that is specified by a memory access protocol used by the host system and the size of a management unit of the memory component in the backing store that stores the data. For example, if the size of the management unit is 512 bytes in the memory component and the protocol specifies using 64 byte requests, then the sectors can have a fixed data size of 64 bytes and the cache line can include eight sectors to equal the 512 bytes of the management unit. In some instances, the management unit can be 128 bytes, for example, and just two sectors having a fixed data size of 64 bytes can be used. The number of sectors of the write-read cache can be larger than the number of sectors for the read-only cache because it is desirable to perform fewer writes to the backing store to improve endurance of the backing store. The memory sub-system can execute one request for 512 byte to the backing store, instead of eight 64 byte requests, to reduce the number of requests that are made to the backing store having large management units in memory components, thereby improving endurance of the memory components.

In some embodiments, the read-only cache and/or the write-read cache can be preloaded with data prior to receiving memory access requests from the host system. For example, the read-only cache and/or the write-read cache can be preloaded during initialization of an application executing on the host system. A memory protocol can include semantics to enable an application to send preload instructions to the memory sub-system to preload the read-only cache and/or the write-read cache with desired data. One or more read requests can be generated by the memory sub-system to obtain the data from the backing store. As described below, outstanding command queues can be used to store the requests in the order in which they are generated and priority scheduling can be performed to determine a schedule of executing the requests. Fill operations can be generated to store the data obtained from the backing store in one or more sectors of a cache line in the read-only cache and/or the write-read cache. The applications can send the preload instructions based on the data that the applications typically use during execution or the data that the application plans to use.

Further, outstanding command queues can be used to store read requests and write requests to prevent data hazards and enhance the quality of service of accessing data in the memory sub-system. The outstanding command queues can improve request traffic throughput based on different types of traffic in the memory sub-system. For example, the memory sub-system can use control logic and the outstanding command queues to provide in-order accesses for data requested at the same cache line and out-of-order accesses to data requested at different cache lines. A separate outstanding command queue can be used for the read-only cache and the write-read cache. Each cache line of the read-only outstanding command queue can correspond to a respective cache line in the read-only cache, and each cache line of the write-read outstanding command queue can correspond to a respective cache line in the write-read cache. There can be a fewer number of queues in each of the outstanding command queues than the number of cache lines in the read-only cache and the write-read cache.

In general, requests can be received from the host system. Both a read-only content addressable memory (CAM) and a write-read CAM can be searched to determine if a matching tag associated with an address included in the request is present in the CAMs. If a matching tag is found, the data can be returned from the corresponding cache line for a read request or the data can be written to the cache line for a write request. If the matching tag is not found in either CAM, the read-only outstanding command queue and the write-read outstanding command queue can be searched for the matching tag. If the matching tag is found in either of the outstanding command queues, then there are pending requests for the cache line assigned to the tag and the received request is stored in the queue behind the other requests for the data at the address. If the matching tag is not found in either of the outstanding command queues, a queue can be selected as the desired outstanding command queue and the tag of the request can be assigned to the selected outstanding command queue. Further, the memory sub-system can set a block bit to block the selected outstanding command queue and store the request in the selected outstanding command queue. The requests can process in the order in which the requests are received in the same queue. There can be out-of-order access to the different cache lines based on when requests are received and by using the block bit to block and unblock different outstanding command queues assigned to the different cache lines, as described in further detail below.

In some embodiments, to further improve performance and quality of service of the memory sub-system, a priority scheduler can be used with a priority queue to determine a schedule of when to execute requests and fill operations. As described above, the outstanding command queues can queue misses for read requests for data and misses for write requests for data in the caches. A priority scheduler can determine a schedule of when to execute the requests based on when the requests are received. The priority scheduler can generate and assign priority indicators (e.g., tokens having a priority value) to the requests to maintain the order for the requests and the fill operations that are generated to store the data obtained from the backing store at cache lines of the cache.

For example, for read request misses, the priority scheduler can generate a priority indicator having a higher priority value for a fill operation associated with the particular read request that can be assigned when the data associated with the particular read request is obtained from the backing store. When the requests are stored in the outstanding command queues and the schedule for execution is determined, the priority scheduler can relay the requests to be stored in the priority queue. The requests can be processed in the order in which they are stored in the priority queue to obtain data associated with the requests from the backing store or write data associated with the requests to the backing store. The data that is returned from the backing store can be stored in a fill queue with a fill operation that is assigned a priority indicator. The priority indicators can specify to perform fill operations in the fill queue first and can be used to regulate the processing of the requests through the outstanding command queues.

As described further below, there are certain instances when requests for data stored at different cache lines can be executed out of order. That is, one request to read data can be executed from the outstanding command queue but another request in the same outstanding command queue for the same data can be blocked to allow execution of yet another request in a different outstanding command queue. In such instances, the requests can be executed out of order based on the priority indicators that are assigned to the requests and the fill operations associated with the requests. Performing the requests out of order between the outstanding command queues can be done to prevent applications from having to wait on data that is obtained from the backing store. Such a technique can improve the quality of service of returning data to the host system, thereby improving performance of the memory sub-system.

Advantages of the present disclosure include, but are not limited to, improved endurance of the memory components by using sectored cache lines to accumulate requests so that the number of requests performed on the memory components can be reduced. Also, using separate read-only and write-read caches can provide separate spaces for reading data from and writing data to for applications executing on the host system. The separate spaces can improve performance of accessing data for the applications by detecting the type of memory access workload used by the applications and selecting an appropriate cache to fulfill the memory accesses for the applications. Additionally, the quality of service and performance of the memory sub-system can be improved by using the outstanding command queues and priority scheduler to determine a schedule of executing the requests.

FIG. 1 illustrates an example computing environment 100 that includes a memory sub-system 110 in accordance with some embodiments of the present disclosure. The memory sub-system 110 can include media, such as memory components 112A to 112N. The memory components 112A to 112N can be volatile memory components, non-volatile memory components, or a combination of such. In some embodiments, the memory sub-system is a storage system.

An example of a storage system is a SSD. In some embodiments, the memory sub-system 110 is a hybrid memory/storage sub-system. In general, the computing environment 100 can include a host system 120 that uses the memory sub-system 110. For example, the host system 120 can write data to the memory sub-system 110 and read data from the memory sub-system 110.

The host system 120 can be a computing device such as a desktop computer, laptop computer, network server, mobile device, or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a negative-and (NAND) type flash memory. Each of the memory components 112A to 112N can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system 120. Although non-volatile memory components such as NAND type flash memory are described, the memory components 112A to 112N can be based on any other type of memory such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 112A to 112N can be grouped as memory pages or data blocks that can refer to a unit of the memory component used to store data.

The memory system controller 115 (hereinafter referred to as "controller") can communicate with the memory components 112A to 112N to perform operations such as reading data, writing data, or erasing data at the memory components 112A to 112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or other suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 may not include a controller 115, and may instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory components 112A to 112N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 112A to 112N. The controller 115 can further include host interface circuitry to communicate with the host system 120 via the physical host interface. The host interface circuitry can convert the commands received from the host system into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory components 112A to 112N.

The memory sub-system 110 includes a caching component 113 that can use a separate read-only cache and write-read cache in a memory sub-system. In some embodiments, the controller 115 includes at least a portion of the caching component 113. For example, the controller 115 can include a processor 117 (processing device) configured to execute instructions stored in local memory 119 for performing the operations described herein. In some embodiments, the caching component 113 is part of the host system 110, an application, or an operating system.

The caching component 113 can use a separate read-only cache and write-read cache in the memory sub-system 110. The read-only cache can be used for sequential read requests for data in the memory components and the write-read cache can be used to handle read and write requests for data in the media components. The separate caches can improve performance of the memory sub-system by reading/writing data faster than accessing the slower backing store every time. Further, the separate caches improve endurance of the backing store by reducing the number of requests to the backing store by using sectors in cache lines. In some embodiments, the caching component 113 can detect a memory access workload, such as sequential memory access workloads or random memory access workloads. The data requested in the sequential memory access workloads can be populated in the read-only cache for faster access than using the backing store every time. The data associated with the random write and read requests can be populated in the write-read cache. In some embodiments, the caching component 113 can receive preload instructions from one or more applications executing on the host system 120 and preload the read-only cache and/or the write-read cache to improve quality of service.

Further, the caching component 113 can use outstanding command queues to store read requests and write requests to prevent data hazards and enhance the quality of service of accessing data in the memory sub-system. The outstanding command queues can improve request traffic throughput based on different types of traffic in memory sub-systems. The controller can use control logic and the outstanding command queues to provide in-order accesses for data requested at the same cache line and out-of-order accesses to data requested at different cache lines.

In some embodiments, to further improve performance and quality of service of the memory sub-system, the caching component 113 can use a priority scheduler with a priority queue to determine a schedule of when to execute requests and fill operations. As described above, the outstanding command queues can queue misses for read requests for data and misses for write requests for data in the caches. A priority scheduler can determine a schedule of when to execute the requests based on when the requests are received. The priority scheduler can generate and assign priority indicators (e.g., tokens having a priority value) to the requests to maintain the order for the requests and the fill operations that are generated to store the data obtained from the backing store at cache lines of the cache.

Figure 2:
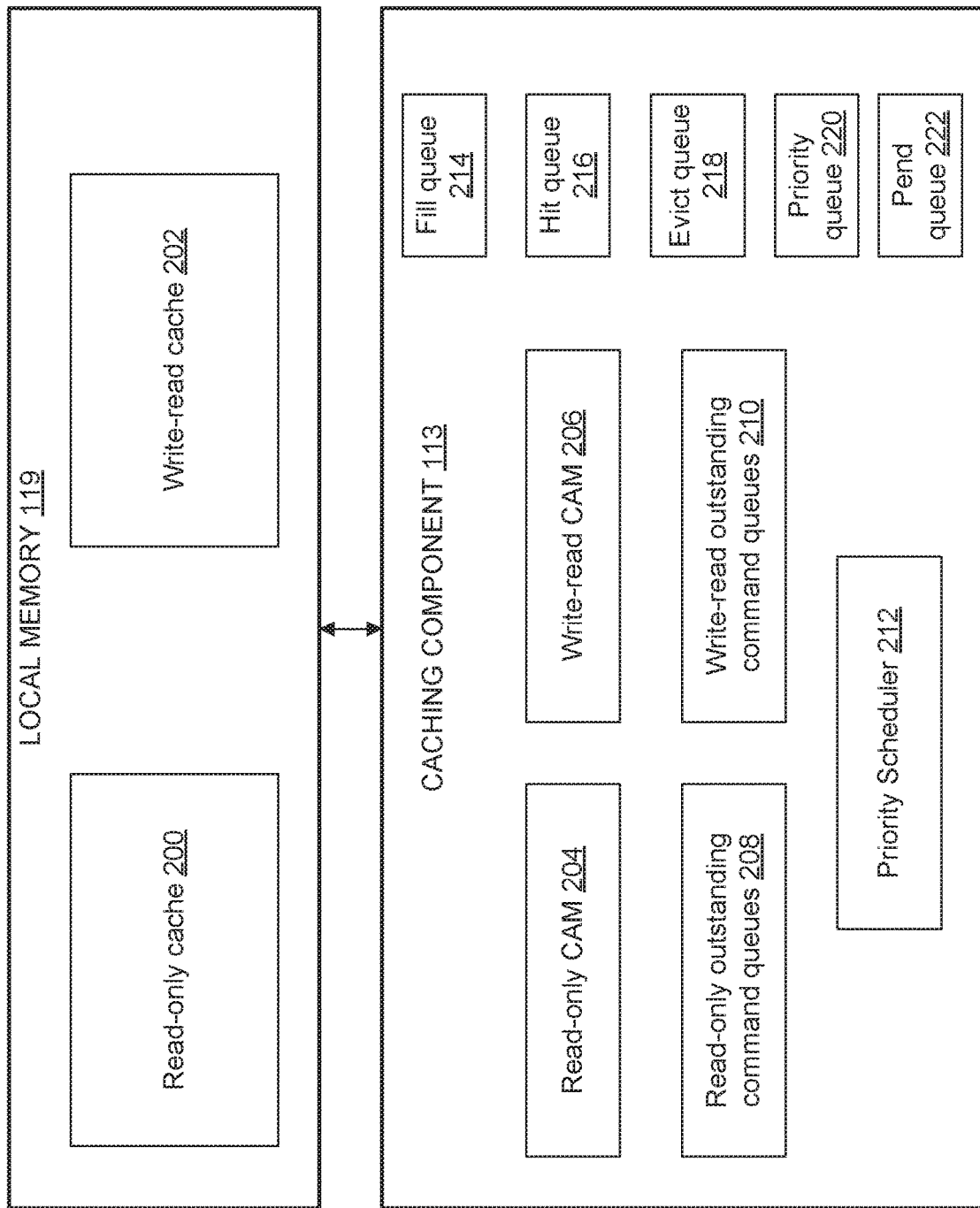
FIG. 2 illustrates an example caching component and local memory of the memory sub-system in accordance with some embodiments of the present disclosure.

FIG. 2 illustrates an example caching component 113 and local memory 119 of the memory sub-system 110 in accordance with some embodiments of the present disclosure. As depicted, the local memory 119 can include a separate read-only cache 200 and a write-read cache 202. The caching component 113 can include a read-only content-addressable memory (CAM) 204 for the read-only cache 200, a write-read CAM 206 for the write-read cache 202, read-only outstanding command queues 208, and a write-read outstanding command queues 210. The read-only outstanding command queues 208 and the write-read outstanding command queues 210 can be first-in, first-out (FIFO) queues. The structure and contents of the read-only CAM 204, the write-read CAM 206, the read-only outstanding command queues 208, and the write-read outstanding command queues 210 is discussed further below. The caching component 113 also includes a priority scheduler 212 that determines a schedule for executing requests and/or fill operations using priority indicators (e.g., numerical tokens). The caching component 113 can include a state machine that also determines the number of read requests that are needed for a size of the cache line of the read-only cache 200 or write-read cache 202 that is to be filled with data from the backing store. The priority scheduler 212 can also include arbitration logic that determines the order in which requests and/or fill operations are to execute. The arbitration logic can specify scheduling requests and/or fill operations in the order in which the operations are received. One purpose of the arbitration logic can be to not keep applications waiting if the data is obtained in the caching component 113 from the backing store. As such, the priority scheduler 212 can assign a higher priority to fill operations and data. Additional functionality of the priority scheduler 212 is discussed below.

The caching component 113 also includes various queues that are used for different purposes. The queues can be first-in, first-out (FIFO) queues. As such, the queues can be used to process requests, operations, and/or data in the order in which the requests, operations, and/or data are received and stored in the various queues. The caching component 113 can include a fill queue 214, a hit queue 216, an evict queue 218, a priority queue 220, and a pend queue 222. The fill queue 214 can store data obtained from the backing store and fill operations generated for the data. The fill operations can be generated when a read request is received and the requested data is not found (cache miss) in either read-only cache 200 or write-read cache 202. The hit queue 216 can store the requests for data that is found (cache hit) in the read-only cache 200 or the write-read cache 202.

The evict queue 218 can be used to evict data from the read-only cache 200 and/or the write-read cache 202 as desired. For example, when the read-only cache 200 and/or the write-read cache 202 are full (every cache line includes at least some valid data in one or more sectors), an eviction policy such as least recently used can be used to select the cache line with data that is least recently used to evict. The data of the selected cache line can be read out of the read-only cache 200 and/or write-read cache 202 and stored in the evict queue 218. The selected cache line can then be invalidated by setting a valid bit to an invalid state. The invalid cache line can be used to store subsequent data.

The priority queue 220 can store requests to execute on the backing store. The priority scheduler 212 can assign priority indicators to each request that is received and/or fill operation that is generated for the requests when the requests are received. The priority scheduler 212 can use the priority indicators to determine a schedule of executing the requests and/or fill operations. Based on the determined schedule, the priority scheduler 212 stores the request in the priority queue 220 to be executed no the backing store in the order the requests are stored in the priority queue 220. The pend queue 222 can store requests that are received for data not found in the caches 200 and 202 when there are no available read-only outstanding command queues 208 or write-read outstanding command queues 210 available.

The read-only cache 200 and write-read cache 202 included in the local memory 119 can provide faster access to data stored in the slower memory components of the backing store. The read-only cache 200 and write-read cache 202 can be high-performance, lower-capacity media that store data that is accessed frequently (temporal locality) by applications of the host system 120 or data located in a memory region that has recently been accessed (spatial locality). An application binary or paged software system using the memory sub-system as the address space can have separate memory address regions for reading data from and writing data to by using the read-only cache 200 and the write-read cache 202. There can be numerous cache lines in each of the read-only cache 200 and the write-read cache 202. Each cache line can include one or more sectors that have a fixed size, as discussed further below.

For a read request, the caching component 113 searches the read-only CAM 204 and write-read CAM 206 to determine if a matching tag is found. Finding a matching tag indicates that the data is stored at a cache line of the read-only cache 200 or the write-read cache 202 depending at which CAM 204 or 206 the matching tag is found. If there is a hit, meaning that the matching tag is found in one of the CAMs 204 or 206, then the request is executed relatively quickly as compared to accessing the backing store. If there is a miss, meaning that the matching tag is not found in one of the CAMs 204 or 206, then the read-only outstanding command queues 208 and the write-read outstanding command queues 210 are searched for the matching tag. If there is a hit, and the matching tag is found in one of the outstanding command queues 208 or 210, then the request is stored in the outstanding command queue that is assigned the matching tag. If there is a miss in the outstanding command queues 208 and 210, then one of the outstanding command queues 208 or 210 can be selected and assigned the tag included in the address of the request. The outstanding command queues 208 and 210 can prevent data hazards by enabling processing of requests in the order in which the requests are received for a cache line. Further, the outstanding command queues 208 and 210 can improve quality of service and performance by enabling performing requests out of order for different cache lines when data is obtained faster for a request received subsequent to a first request.

A read-only outstanding command queue 208 or a write-read outstanding command queue 210 can be selected based on the type of memory access workload currently used by the application or based on the type of request. For example, if the memory access workload is sequential, then a read-only outstanding command queue can be selected. If the memory access workload is random, then a write-read outstanding command queue can be selected. If the request is to write data, then a write-read outstanding command queue can be selected. In any instance, an outstanding command queue that has a valid bit set to an invalid state can be selected and the tag of the request can be assigned to the selected outstanding command queue 208 or 210. Each queue in the outstanding command queues 208 and 210 can correspond to a single cache line in either of the caches 200 or 202 at a given time. The valid bit for the selected queue in the outstanding command queues 208 or 210 can be set to a valid state when the tag is assigned. If every outstanding command queue is being used as indicated by having a valid bit set to a valid state, then the request can be stored in the pend queue 222 until an outstanding command queue in the read-only outstanding command queues 208 or the write-read outstanding command queues 210 becomes invalid.

For a write request, the caching component 113 can search the read-only CAM 204 and invalidate the cache line if the cache line includes data for the address being requested. The caching component 113 can identify an empty, invalid cache line in the write-read cache using the write-read CAM 206. The data can be written to the selected cache line in the write-read cache 202. A dirty bit in the write-read CAM 206 can be set for the cache line to indicate that data is written to that cache line. The writing of data to the cache can be performed faster than writing the data to the slower backing store. Subsequent write requests can write data to the same or different cache lines and the dirty bit can be set in the write-read CAM 206 for the cache line at which the subsequent write request is performed. Further, the subsequent data associated with the write request can be made invalid if found in the read-only cache 200. During operation, when is the memory sub-system determines to flush either of the caches 200 or 202, the dirty cache lines can be identified and queued to the evict queue 218 to be sent to the backing store.

Figure 3:
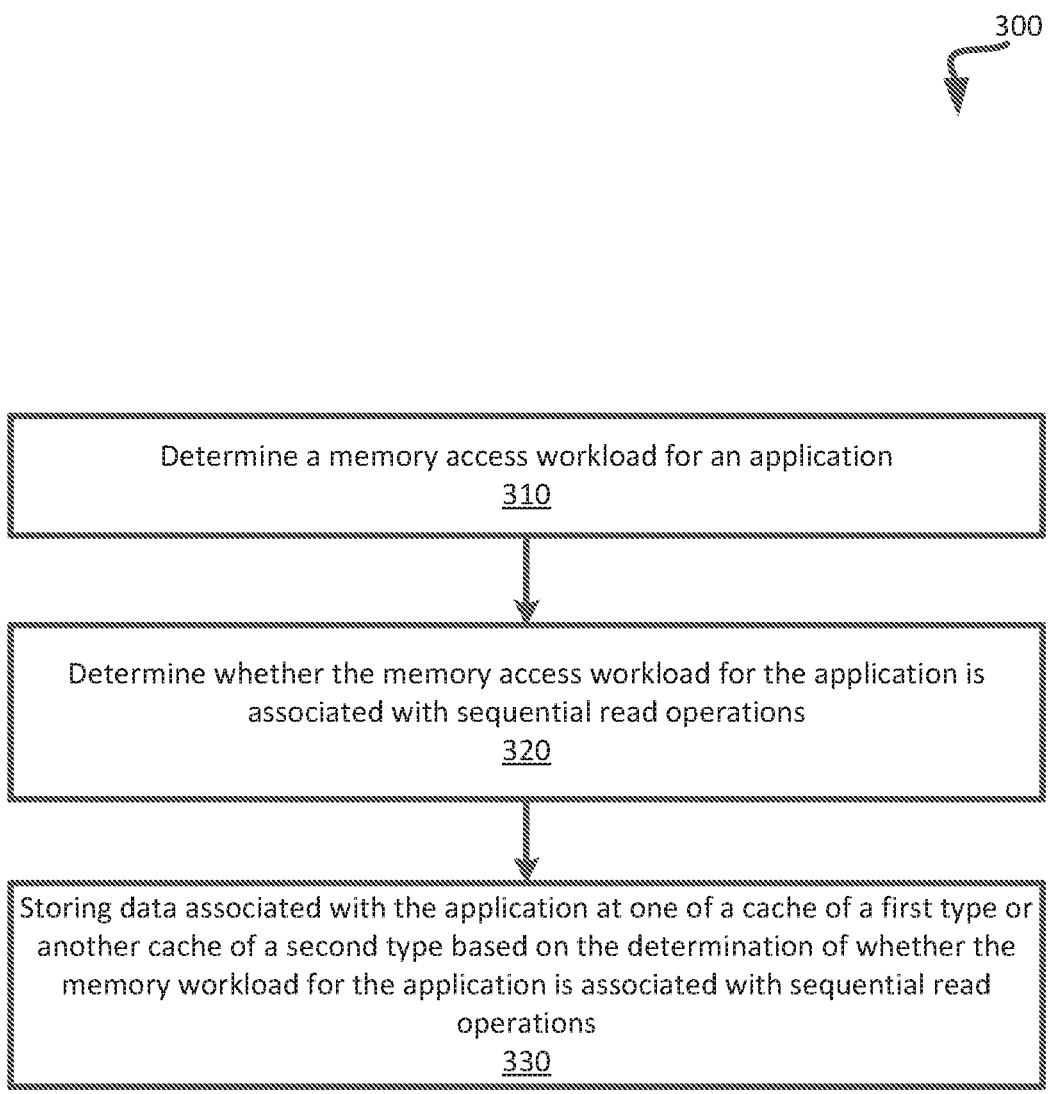
FIG. 3 is a flow diagram of an example method to use a separate read-only cache and write-read cache based on a determined memory access workload of an application in accordance with some embodiments of the present disclosure.

FIG. 3 is a flow diagram of an example method 300 to use a separate read-only cache and write-read cache based on a determined memory access workload of an application in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the caching component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 310, the processing device determines a memory access workload for an application. The processing device can determine the memory access workload for the application by receiving a set of memory access requests from the application, determining a pattern based on the set of memory access requests, and determining the memory access workload for the application based on the pattern. For example, if the same or sequential addresses in a similar address region are being requested to be read, the processing device can determine that the memory access workload is sequential and the read-only cache should be used to store the data associated with the request. Further, if the pattern is indicative of sequential read requests or operations being received one after the other, then the processing device can determine that the memory access workload is sequential and the read-only cache should be used to store the data associated with the request. If the pattern indicates that random read requests and write requests are being received from the application, then the processing device can determine that the memory access workload is random for the application and the write-read cache should be used to store the data associated with the request. In some embodiments, the write-read cache is used to store data associated with any write requests.

At operation 320, the processing device determines whether the memory access workload for the application is associated with sequential read operations. For example, a determination can be made as to whether the memory access workload for the application is sequential or random as described above. At operation 330, the processing device stores data associated with the application at one of a cache of a first type (read-only) or another cache of a second type (write-read) based on the determination of whether the memory workload for the application is associated with sequential read operations. The processing device stores the data associated with the application at the cache of the first type when the memory access workload is associated with sequential read operations. In some embodiments, if the processing device determines that the memory access workload is associated with write and read operations, then the processing device can store the data associated with the application at the cache of the second type.

The processing device can determine if the data is present in either the read-only cache or the write-read cache by searching the respective read-only CAM and write-read CAM. If the data is present in a cache line of either cache, the read request can be executed and the data can be returned to the application. If the data is not present, the read-only outstanding command queue and the write-read outstanding command queue can be searched for the tag associated with the address of the requested data. If the matching tag is not found in the read-only outstanding command queues, the read request can be stored in a queue of the read-only outstanding command queue and executed to obtain the data associated with the request from the backing store. If the matching tag is found in a read-only outstanding command queue, then one or more requests for the cache line are stored in the outstanding command queue and the current request is stored behind the other requests in the read-only outstanding command. The current request will be executed after the other requests for the particular cache line based on a schedule determined by the priority scheduler. Further details with respect to the operation of the outstanding command queues and the priority scheduler are discussed below.

In some embodiments, the processing device can receive the data associated with the application in one or more requests to write the data to a memory component. The one or more write requests can have a fixed data size. The fixed data size is specified by a memory semantic of the protocol used to communicate between the host system and the memory sub-system via a bus. The processing device can store the data associated with the application at one or more sectors of a cache line of the cache of the second type to accumulate data in the cache line based on a determination of whether the memory access workload for the application is associated with write and read operations. Each of the one or more sectors have the fixed data size. The processing device can determine when a cumulative data size of the one or more sectors storing the data associated with the application satisfies a threshold condition. Responsive to determining that the cumulative data size of the one or more sectors storing the data associated with the application satisfies the threshold condition, the processing device can transmit a request to store the cumulative data at the memory component. A write request can be sent to the backing store to write the accumulated data in the cache line when each sector in the cache line includes valid data. In this way, instead of issuing eight write requests to the backing store, just one write request for the cache line can be issued to the backing store. Using this technique can improve the endurance of the memory components in the backing store by performing fewer write operations.

Further, read requests can also be received from an application and the read requests can each have the fixed data size. The cache lines in the read-only memory can be broken up into one or more sectors that each have the fixed data size. When data requested to be read is already present in either of the read-only cache or the write-read cache, the read request can be performed to read the data from the appropriate cache line storing the requested data. When there is a cache miss and neither the read-only cache nor the write-read cache stores the requested data, the read requests can be processed using the outstanding command queues. The priority scheduler can determine a number of read requests to perform based on the size (e.g., two 64 byte sectors) of the cache line. For example, if just one read request for 64 bytes is received, and the cache line size is 128 bytes, the priority scheduler can determine that two read requests for 64 bytes (128 bytes total) are to be performed to return the full data to store in the cache line associated with the request.

In some embodiments, the processing device can receive a command or instruction from an application to preload the read-only cache or the write-read cache with the data associated with the application. Such data can be data that is to be used by or operated on by the application. The processing device can preload the read-only cache or the write-read cache with the data associated with the application before any requests to access the data are received from the application. The instruction can be associated with the memory semantic used in the protocol to communicate between the host system and the memory sub-system. To process the preload instruction, the processing device can generate a suitable number of read requests for the data using a state machine in the priority scheduler. The processing device can store the generated read requests in the read-only outstanding command queue or the write-read outstanding command queue to be executed on the backing store. When the data associated with the read requests is obtained from the backing store, the data can be stored in one or more cache lines of the read-only cache or the write-read cache.

Figure 4:
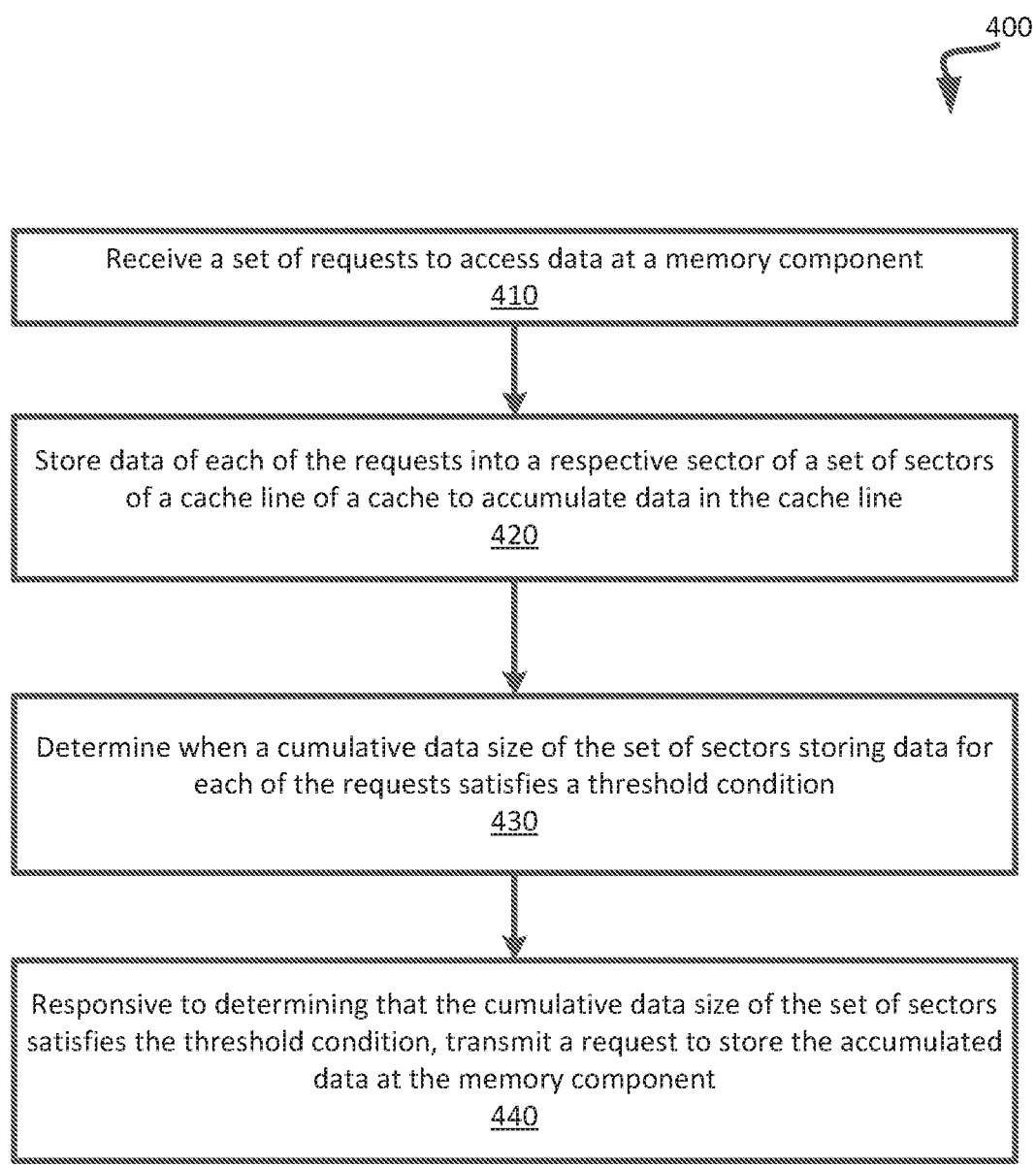
FIG. 4 is a flow diagram of an example method to use sectors having fixed data sizes in a cache line to accumulate data in a cache in accordance with some embodiments of the present disclosure.

FIG. 4 is a flow diagram of an example method 400 to use sectors having fixed data sizes in a cache line to accumulate data in a cache in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the caching component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing device receives a set of requests to access data at a memory component. Each of the requests can specify a fixed size of data. The fixed size of data is specified by a memory access protocol used by the host system to interface with the memory sub-system including one or more memory components in the backing store. The requests can be to write data to the backing store.

At operation 420, the processing device stores data of each of requests into a respective sector of a set of sectors of a cache line of a cache to accumulate data in the cache line. Each respective sector of the set of sectors of the cache line stores cache data at the fixed size. The particular cache line that is selected can be in a write-read cache and can be selected by identifying a cache line that is invalid. In other words, a cache line that does not have any sectors including valid bits set or dirty bits set can be selected initially to store the data of a first request. The first write request can be stored in the write-read outstanding command queue and the tag of the write request can be assigned to one of the outstanding command queues. The outstanding command queue selected can correspond to a cache line at which the data will be written. The processing device can execute the write request in the outstanding command queue to write the data to a sector of the corresponding cache line. Further an entry in the write-read CAM can be created with the tag of the write request. Subsequent requests to write data with a matching tag that is found in the write-read CAM can be stored in the hit queue and then executed to write the data in other sectors. Whenever a sector is written to, the valid bit of the sector can be set to a state indicating valid data is stored. Further, the dirty bit of the sector can be set indicating that data is being written to that sector.

At operation 430, the processing device determines when a cumulative data size of the set of sectors storing data for each of the requests satisfies a threshold condition. The threshold condition can include the cumulative data size satisfying a data size parameter specified for accessing the memory component. For example, a data size parameter for data access requests for a memory component can be set to larger granularities than the data size of the requests received from the host. In one example, the data size parameter can be 512 bytes and the data size of the sectors can be 64 bytes. The threshold condition can be satisfied when 512 bytes of data are accumulated in eight sectors in a cache line.

At operation 440, responsive to determining that the cumulative data size of the set of sectors satisfies the threshold condition, the processing device transmits a request to store the accumulated data at the memory component. The data can remain in the cache line in case the application seeks to quickly access the data. For example, the application can read the data out of the cache line of the write-read cache.

In some embodiments, the processing device can receive a command or instruction to preload data in the cache (e.g., the read-only cache and/or the write-read cache) with other data associated with the application. The processing device can preload the cache with the other data associated with the application prior to receiving the plurality of requests to access the data the memory component. The application can send the instructions to the memory sub-system if the application determines that the data is going to be used frequently by the application.

Figure 5:
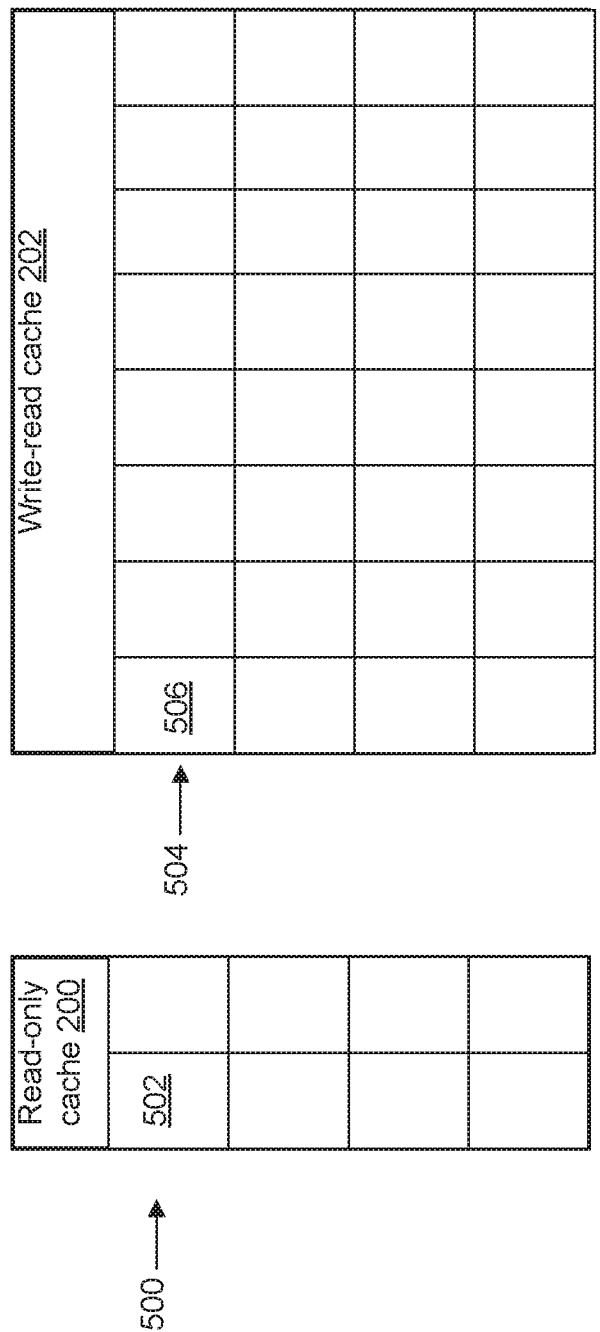
FIG. 5 illustrates an example read-only cache and a write-read cache in accordance with some embodiments of the present disclosure.

FIG. 5 illustrates an example read-only cache 200 and a write-read cache 202 in accordance with some embodiments of the present disclosure. The separate read-only cache 200 and the write-read cache 202 can provide separate address spaces for applications or paged systems to read data from and write data to, which can improve performance of the memory sub-system. The read-only cache 200 and the write-read cache 202 include numerous cache lines 500 and 504, respectively. Although just four cache lines are depicted in each of the caches 200 and 202, it should be understood that there can be many more cache lines included (e.g., hundreds, thousands, etc.). A total size of each of the caches 200 and 202 can be any suitable amount, such as 32 kilobytes.

As depicted, a cache line 500 in the read-only cache 200 includes two sectors 502. Each of the sectors has a fixed size that can be equal to the data size of the requests that are sent from the host system. The data size of the requests can be specified by memory semantics of the protocol used to interface via the bus between the host system and the memory sub-system. In one example, the sectors can each be 64 bytes and a total data size of the cache line 500 can be 128 bytes. Further, a cache line 504 in the write-read cache 202 includes more sectors 506 than the read-only cache 200 because it is desirable to perform write operations on the backing store less often than read operations to improve the endurance of the memory components in the backing store. In the depicted example, the write-read cache 202 includes eight sectors that also have the fixed data size (e.g., 64 bytes). The fixed data size can also be equal to the data size of the requests received from the host system. In one example, the fixed data size of each sector of a cache line 504 in the write-read cache 202 can be 64 bytes. The write-read cache 202 can accumulate data for eight write requests until a cumulative data size for the eight sectors 506 satisfies a threshold condition. The threshold condition can be that the cumulative data size satisfies a data size parameter specified for accessing the memory component. The data size parameter can be a data size of a management unit of the memory component, for example 512 bytes. Responsive to determining that the cumulative data size of the set of sectors 506 of the cache line 504 storing each of the data of the requests satisfies the threshold condition, the caching component can transmit a write request to store the cumulative data at the backing store.

Figure 6:
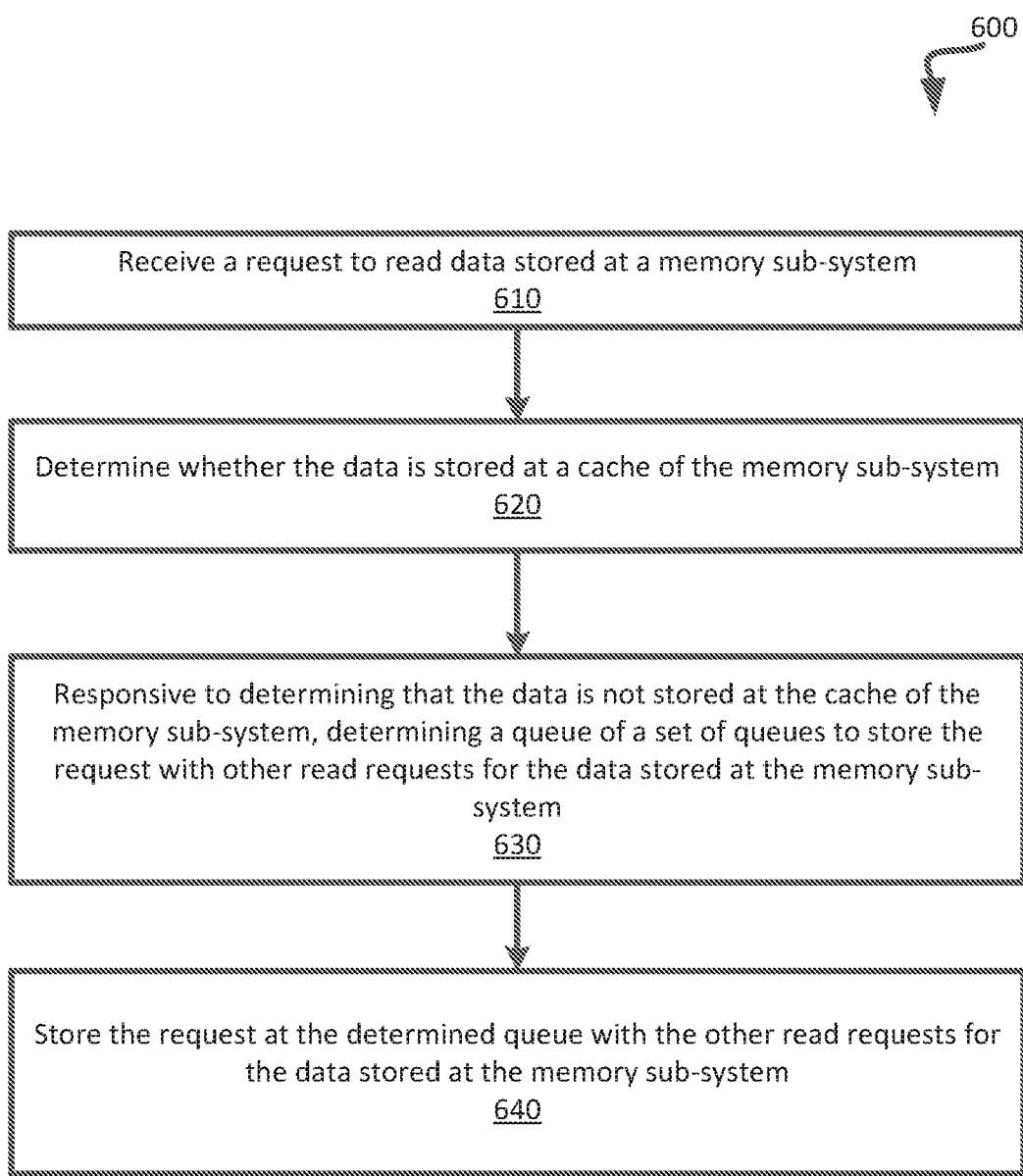
FIG. 6 is a flow diagram of an example method to store a read request for data that is not present in a cache in an outstanding command queue in accordance with some embodiments of the present disclosure.

FIG. 6 is a flow diagram of an example method 600 to store a read request for data that is not present in a cache in an outstanding command queue in accordance with some embodiments of the present disclosure. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by the caching component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 610, the processing device receives a request to read data stored at a memory sub-system. The request to read data can be sent from an application executing on the host system. The request can include an address from which to read the data in the memory sub-system. An identifier, referred to as a "tag", can be extracted from the address. The tag can be a subset of bits of the address that can be used to identify the location of the data at the address in the memory sub-system.

At operation 620, the processing device determines whether the data is stored at a cache of the memory sub-system. In some embodiments, the processing device searches for the tag associated with the requested data in a read-only CAM and a write-read CAM. The read-only CAM and the write-read CAM can include tags corresponding to the data stored at every cache line in the respective CAM. The processing device can use a comparator in each of the read-only CAM and the write-read CAM to determine whether a matching tag is found for the requested address from which to read data. Determining whether the data is stored in the cache can include determining whether a valid bit is set to a valid state for the data in the CAM in which the matching tag is found. Responsive to determining that the data is stored at the cache of the memory sub-system, the processing device can store the request at another queue (e.g., a hit queue) used to manage execution of requests for data that is present in the cache.

At operation 630, responsive to determining that the data is not stored at the cache of the memory sub-system, the processing device determines a queue of a set of queues to store the request with other read requests for the data stored at the memory sub-system. In some embodiments, the cache can refer to the read-only cache or the write-read cache. The set of queues can include the read-only outstanding command queue or the write-read outstanding command queue depending on which cache is selected to service the request. These queues can be used to store cache misses (e.g., read misses and write misses). As discussed above, the memory access workload can dictate which cache to use to service the request. If the memory access workload includes sequential read operations, then the read-only cache and the read-only outstanding command queues can be used to service the request. If the memory access workload includes random read and write operations, then the write-read cache and the write-read outstanding command queues can be used to service the request.

The processing device can determine the queue by determining if any queue in the set of queues are associated with the identifier of the request. The processing device can search the read-only outstanding command queue and the write-read outstanding command queue for a queue that is assigned the identifier of the request. If there are no queues assigned the identifier, the processing device can select a queue that has a valid bit set to an invalid state and/or a block bit set to an unblocked state from the appropriate set of queues. The processing device can store the request in the queue in the invalid state, assign the tag to the queue, set the valid bit to a valid state, and set the block bit to a blocked state. If every queue in the appropriate set of queues is being used (have valid bits set to valid state and block bit set to blocked state), then the request is stored in a pend queue until a queue becomes invalid in the appropriate set of queues.

If one of the queues in the set of queues is assigned the identifier and is valid, then there are other requests that have been received for the same address that are already stored in the queue. At operation 640, the processing device stores the request at the determined queue with the other read requests for the data stored at the memory sub-system. Each queue of the set of queues corresponds to a respective cache line of the cache. The queue corresponds to the respective cache line by assigning the tag of the request to the queue and also to an entry in the appropriate CAM that corresponds to the cache line storing the data of the request in the appropriate cache.

The request can be assigned a priority indicator and relayed to a priority queue by a priority scheduler when the request is stored in the queue, as discussed further below. The priority scheduler can determine a number of requests to generate for the request based on size of the cache line. For example, if the request is for 64 bytes but the cache line size is 128 bytes, then the priority scheduler can determine to generate two requests of 64 bytes to read data out of the backing store to fill the entire cache line with valid data. The priority scheduler can increment a read counter and a fill counter when the request is stored in the priority queue. The requests can be executed on the backing store to obtain the desired data and the read counter can be decremented.

The data obtained from the backing store can be stored in another queue (fill queue) with a fill operation. The processing device can assign the fill operation a priority indicator and execute the fill operation to store the data to the appropriate cache line in the cache. The processing device can set the block bit for the queue storing the requests to unblocked state and can decrement the fill counter. A CAM entry can be generated for the cache line storing the data and the tag can be assigned to the CAM entry. The processing device can execute the requests in the queue to either read the data from the cache line or write the data to the cache line. Further, after the requests in the queue are executed, the processing device can invalidate the queue by setting the valid bit to an invalid state and un-assigning the tag. The queue can then be reused for the same or another cache line based on subsequent requests that are received.

In some embodiments, the processing device can receive a write request to write data to the backing store. The processing device can obtain a tag from the request and search the write-read CAM and the write-read outstanding command queues for the tag. If a matching tag is found in the write-read CAM, then the data in the request is written into the cache line corresponding to the tag. The processing device can select one or more invalid sectors in the cache line to which to write the data. When the data is written into the one or more sectors, the valid bits and dirty bits of the one or more sectors can be set by the processing device in the write-read CAM entry corresponding to the cache line including the one or more sectors.

If a matching tag is not found in the write-read CAM but is found in a write-read outstanding command queue, then other requests including the tag are stored in the identified queue that is assigned the matching tag. The processing device can store the write request in the queue assigned the matching tag and the request can be processed similar in the order in which it is received to write the data to one or more sectors of the corresponding cache line in the write-read cache. For example, the priority scheduler can generate a priority indicator for the write request and assign the priority indicator to the write request. The priority scheduler can store the write request in the priority queue, and the write request can be executed when it reaches the front of the queue to write the data to the cache line. Storing the write request in the outstanding command queue can prevent data hazards from occurring by not allowing the write request to execute before other requests that were received before the write request.

Figure 7:
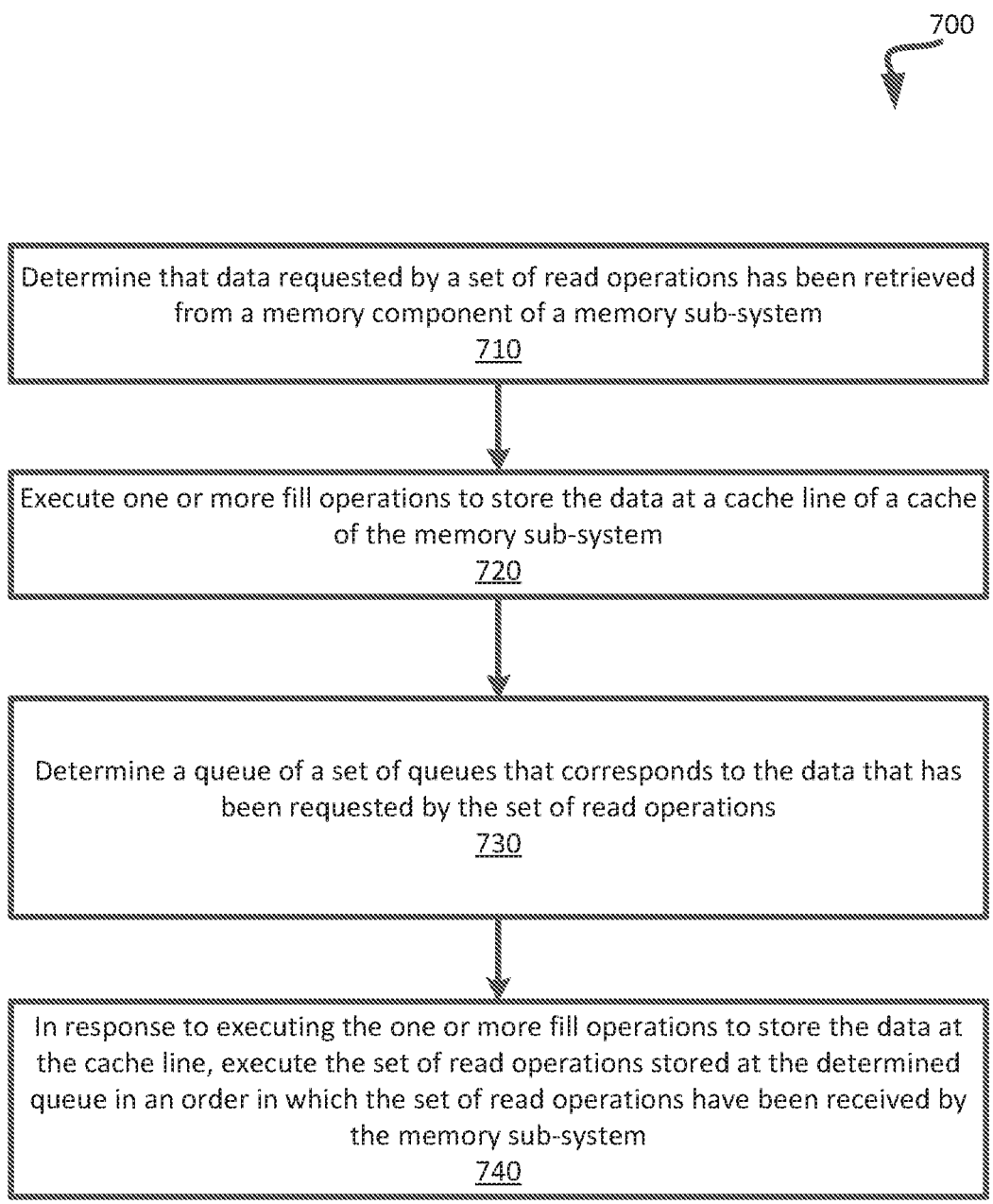
FIG. 7 is a flow diagram of an example method to execute the requests stored in an outstanding command queue in accordance with some embodiments of the present disclosure.

FIG. 7 is a flow diagram of an example method 700 to execute the requests stored in an outstanding command queue in accordance with some embodiments of the present disclosure. The method 700 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 is performed by the caching component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 710, the processing device determines that data requested by a set of read operations has been retrieved from a memory component of a memory sub-system. The data retrieved from the memory component can be associated with a fill operation that is generated and the data and the fill operation can be stored in a fill queue.

At block 720, the processing device executes the one or more fill operations to store the data at a cache line of a cache of the memory sub-system. A fill operation can be generated when the data is retrieved from the backing store. The fill operation can be stored in the fill queue with associated data when the fill operation is generated. The fill operations can be executed in the order that they are stored in the fill queue. Executing the fill operation can include removing the data from the fill queue and storing the data at the appropriate cache line in the cache (e.g., read-only cache or the write-read cache). The processing device can decrement a fill counter for each of the one or more fill operations executed. In response to executing the one or more fill operations to store the data at the cache line, the processing device can set a block bit associated with the determined queue to an unblocked state to enable execution of the requests stored at the determined queue.

At operation 730, the processing device determines a queue of a set of queues that corresponds to the data that has been requested by the set of read operations. Each queue of the set of queues corresponds to a respective cache line of a set of cache lines of a cache of the memory sub-system. The cache can be a read-only cache and/or a write-read cache, and the set of queues can be the read-only outstanding command queue and/or the write-read outstanding command queue. Determining that the queue corresponds to the data that was requested can include determining if the queue is assigned an identifier (e.g., a tag) associated with the data.

At operation 740, in response to executing the one or more fill operations to store the data at the cache line, the processing device executes the set of read operations stored at the determined queue in an order in which the set of read operations have been received by the memory sub-system. Using an outstanding command queue for storing requests enables in-order access to a cache line corresponding to the outstanding command queue, which can prevent data hazards in the memory sub-system. The requests can be assigned priority indicators by the priority scheduler, which can be based on the order in which the requests are received by the memory sub-system, as described further below. The read operations can read the data stored at the cache line and return the data to the application that sent the request.

FIG. 8 illustrates examples of read-only outstanding command queues 208, write-read outstanding command queues 210, a read-only content-addressable memory 204, and a read-only content-addressable memory 206 in accordance with some embodiments of the present disclosure. As depicted, the read-only outstanding command queues 208 can include multiple entries and each entry can include fields for a tag, a queue counter, a queue for the requests, a read counter and valid bit, and a fill counter and valid bit.

The tag field stores the tag obtained from the request received from the host system. The queue counter can track the number of requests that are stored in the entries in the queue. The queue counter (qc) can be incremented when additional requests are stored in the queue and decremented when the requests are executed and removed from the queue. The queue for the requests can have any suitable number of entries. In one example, the number of entries in the queue is equal to the number of sectors in a cache line of the read-only cache. There can be a block bit that is set for a request when the request is stored in the queue.

The read counter (R) can track the number of read operations that are to be performed to obtain the requested data from the backing store. The read counter can be incremented when the number of read operations are determine to retrieve the data from the backing store and can be decremented when the read operations are performed on the backing store to obtain the data. The valid bit for the read counter can indicate whether the data associated with the read is valid or invalid. The fill counter (F) can track the number of fill operations to execute to store the requested data in the cache line corresponding to the queue storing the request. The fill counter can be incremented when the fill operations are generated and decremented when the fill operations are executed. The valid bit for the fill counter can indicate whether the data associated with the fill operation is valid or invalid.

The write-read outstanding command queues 210 can include multiple entries and each entry can include fields for a tag, a queue counter, a queue for the requests, an evict counter (E) and valid bit, and a write-back counter (WB) and valid bit. The tag field stores the tag obtained from the request received from the host system. The queue counter can track the number of requests that are stored in the entries in the queue. The queue counter can be incremented when additional requests are stored in the queue and decremented when the requests are executed and removed from the queue. The queue for the requests can have any suitable number of entries. In one example, the number of entries in the queue is equal to the number of sectors in a cache line of the write-read cache. There can be a block bit that is set for a request when the request is stored in the queue.

The evict counter can track the number of eviction operations that are to be performed to remove data from the write-read cache. The evict counter can be incremented when data of a cache line is selected to be evicted and decremented when the data in the cache line is evicted from the cache. The valid bit for the evict counter can indicate whether the data associated with the eviction is valid or invalid. The write-back counter can track the number of write operations to execute to write the data in a cache line corresponding to the queue to the backing store. The write-back counter can be incremented when write requests are stored in the queue and decremented when the write requests are executed. The valid bit for the write-back counter can indicate whether the data associated with the write operation is valid or invalid.

The read-only CAM 204 can include multiple entries and each entry can include fields for a tag, valid bits for each sector, dirty bits for each sector, and an address. The tag field stores the tag obtained from the request. The valid bit for each sector can be set when the sector of the cache line corresponding to the entry stores valid data. The dirty bit for each sector can be set when data is being stored at the sector. The address field can store the address included in the request.

The write-read CAM 206 can include multiple entries and each entry can include fields for a tag, valid bits for each sector, dirty bits for each sector, and an address. The tag field stores the tag obtained from the request. The valid bit for each sector can be set when the sector of the cache line corresponding to the entry stores valid data. The dirty bit for each sector can be set when data is being stored at the sector. The address field can store the address included in the request.

When a request is received to access (e.g., read or write) data, a tag can be obtained from an address of data included in the request. The processing device can search the read-only outstanding command queues 208, the write-read outstanding command queues 210, the read-only CAM 204, and the write-read CAM 206 for a matching tag. If either the read-only CAM 204 or the write-read CAM 206 includes a matching tag, then there is a cache hit and the request can be stored in a hit queue to be executed. For example, for a read request cache hit, the data stored at the cache line corresponding to the entry in the CAM 204 or 206 having the matching tag can be returned to the requesting application. For a write request cache hit, the data in the request can be written to the cache line corresponding to the entry in the write-read CAM 206 having the matching tag. The dirty bits in the write-read CAM 206 for the sectors to which the data are written can be set when the writing commences. The valid bits in the write-read CAM 206 for the sectors can be set when the data is written to the sectors.

If the matching tag is not found in the read-only CAM 204 or the write-read CAM 206, but is found in the read-only outstanding command queues 206, then the request can be stored in an empty entry in the read-only outstanding command queue corresponding to the matching tag. The queue counter can be incremented, the read counter, and the fill counter can be incremented when the request is stored in the read-only outstanding command queue.

If the matching tag is not found in the read-only CAM 204 or the write-read CAM 206, but is found in the write-read outstanding command queues 210, then the request can be stored in an empty entry in the write-read outstanding command queue corresponding to the matching tag. The queue counter can be incremented and the write-back counter can be incremented when the request is stored in the write-read outstanding command queue.

If the matching tag is not found in any of the read-only CAM 204, the write-read CAM 206, the read-only outstanding command queues 206, or the write-read outstanding command queues 210, then a queue is selected from the read-only outstanding command queues 204 or the write-read outstanding command queues 210 based on the memory access workload used by the application. If the memory access workload is using sequential read operations, then the read-only outstanding command queues 208 are selected to be used to store the request. An entry in the read-only command queues 208 that includes valid bits set to the invalid state, is not assigned a tag, and is not blocked can be selected to store the read request. The read request can be stored at a read-only outstanding command queue, the tag of the request can be stored in the tag field, a block bit can be set for the request in the queue, the queue counter can be incremented, the read counter can be incremented, the fill counter can be incremented, and/or the valid bit can be set for the read counter.

If the memory access workload is using random write and read operations, then the write-read outstanding command queues 210 are selected to be used to store the request. An entry in the read-only command queues 208 that includes valid bits set to the invalid state, is not assigned a tag, and is not blocked can be selected to store the write request. The write request can be stored at a write-read outstanding command queue, the tag of the request can be stored in the tag field, a block bit can be set for the request in the queue, the queue counter can be incremented, the write-back counter can be incremented, and the valid bit can be set for the write-back counter.

Figure 9:
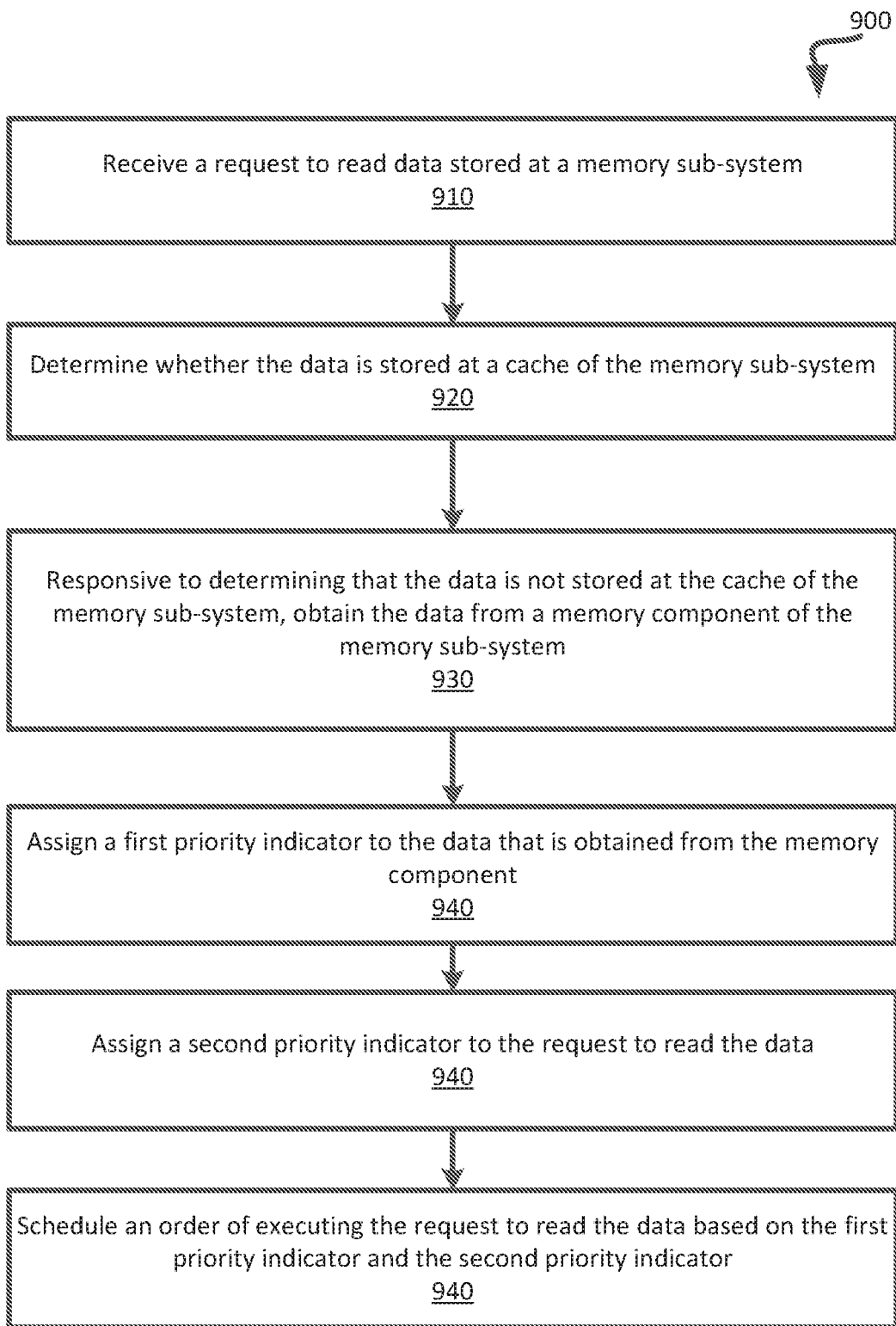
FIG. 9 is a flow diagram of an example method to determine a schedule to execute requests in a memory sub-system in accordance with some embodiments of the present disclosure.

FIG. 9 is a flow diagram of an example method 900 to determine a schedule to execute requests in a memory sub-system in accordance with some embodiments of the present disclosure. The method 900 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 900 is performed by the caching component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 910, the processing device receives a request to read data stored at a memory sub-system. The request to read the data can be received from an application executing on the host system. The request can include an address of the memory sub-system from which to read the data.

At operation 920, the processing device determines whether the data is stored at a cache of the memory sub-system. The memory sub-system can include a separate read-only cache and a write-read cache. The processing device can determine whether the data is stored at the cache by obtaining a tag from the address included in the request. The processing device can search a read-only CAM and a write-read CAM to determine whether a matching tag is included in either CAM. If there is not a matching tag found, then the processing device determines that the data is not stored at either the read-only cache or the write-read cache. The processing device can determine that the tag is also not included in the read-only outstanding command queue or the write-read outstanding command queue by searching both for a matching tag. As described above, the processing device can select a queue from the read-only outstanding command queues or the write-read outstanding command queues. The processing device can execute a state machine included in the priority scheduler or implemented separately to determine the number of requests needed to obtain the data based on the size of the cache line in the appropriate cache. The processing device can store the one or more requests in the selected outstanding command queue that is used to store requests to read from or write to an address associated with the data. The processing device can determine that a fill operation will be used for the read request to store the data obtained from the backing store to the cache. A priority scheduler can generate priority indicators (e.g., tokens having numerical values) for the read request and the fill operation. The processing device can employ a policy that specifies that fill operations have priority indicators with higher values to enable the fill operations to perform before the read requests. The priority indicators can be generated and assigned to read requests and fill operations in the order in which the read requests are received.

At operation 930, responsive to determining that the data is not stored at the cache of the memory sub-system, the processing device obtains the data from a memory component of the memory sub-system. The processing device can obtain the data from the memory component by storing the read request in a priority queue and executing the read request to obtain the data from the memory component. The fill operation can be generated when the data is obtained from the memory component.

At operation 940, the processing device assigns a first priority indicator (e.g., a token with a value of "1") to the fill operation associated with the data that is obtained from the memory component. The fill operation and the data obtained from the memory component can be stored in a fill queue.

At operation 950, the processing device assigns a second priority indicator (e.g., a token with a value of "2") to the request to read the data. The first priority indicator assigned to the fill operation can have a higher priority value than the second priority indicator assigned to the request to read the data.

At operation 960, the processing device schedules an order of executing the fill operation and the request to read the data based on the first priority indicator and the second priority indicator. The priority schedule can use arbitration logic to determine the schedule. If no other requests have been received, the processing device can use the schedule to execute the fill operation to remove the data from the fill queue and store the data in a cache line corresponding to the queue where the read request is stored. Further, the processing device can execute the read request to read the data in the cache line and return the data to the requesting application.

In some embodiments, while the request to read the data is stored in an outstanding command queue (e.g., read-only or write-read), the processing device can receive a second request to read the data stored at the memory sub-system. The processing device can determine whether an identifier (tag) associated with the second request to read the data is assigned the outstanding command queue. Responsive to determining that the identifier associated with the second request to read the data is assigned to the outstanding command queue, the processing device can assign a third priority indicator the second request, and store the second request in the outstanding command queue in an entry behind the initial request to read the data.

In some embodiments, the processing device can receive a third request to write other data to the address associated with the data at the memory sub-system. The processing device can determine whether an identifier associated with the third request to write the other data is assigned to the queue. Responsive to determining that the identifier associated with the third request to write the other data is assigned to the queue, the processing device can assign a fourth priority indicator to the third request and store the write request in an entry behind the second request. The processing device can determine a schedule of executing the fill operation, the request to read the data, the second request to read the data, and the third request to write the other data based on the first priority indicator, the second priority indicator, the third priority indicator, and the fourth priority indicator. The schedule can reflect an order in which the request, the second request, and the third request were received in the outstanding command queue. If no other requests are received, the schedule can be used to execute the fill operation, the request to read the data, the second request to read the data, and the third request to write the other data.

In some embodiments, the processing device can receive a second request to read other data stored at the memory sub-system. The processing device can determine whether the other data is stored at the cache of the memory sub-system by searching the read-only CAM and the write-read CAM for a tag matching the tag included in the second request. If the data is not stored at the cache and the processing device determines that the matching tag is also not found in the read-only outstanding command queue or the write-read outstanding command queue, a second outstanding command queue can be selected to store the second request to read the other data. The second outstanding command queue that stores the second request to read the other data can be different than the outstanding command queue used to store the request to read the data. Responsive to determining that the other data is not stored at the cache of the memory sub-system, the processing device can obtain the other data from the memory component of the memory sub-system.

The processing device can determine that a second fill operation will be used to store the requested data obtained from the memory component at the appropriate cache. The processing device can generate a priority indicator for the second fill operation and the second request to read the data. The second fill operation can be generated and the third priority indicator can be assigned to the second fill operation. A fourth priority indicator can be generated and assigned to the second request to read the other data. The processing device can determine a schedule of executing the fill operation, the request to read the data, the second fill operation, and the second request to read the other data based at least on the first priority indicator, the second priority indicator, the third priority indicator, and the fourth priority indicator.

The processing device can execute, based on the determined schedule, the request to read the data and the second request to read the other data in a different order than in which the request to read the data and the second request to read the other data were received. For example, in some instances, even though the request to obtain the data was sent to the backing store first, the other data requested by the second request can return faster from the backing store. In such an instance, the processing device can determine to process the second fill operation for the other data first and the second request to read the other data before the fill operation and the request to read the data. The fill operation can store the data in a cache line corresponding to the outstanding command queue and the second fill operation can store the other data in a second cache line corresponding to the second outstanding command queue. The request to read the data can read the data from the cache line and return the data to an application that sent the request. The second request to read the data can read the other data from the second cache line and return the other data to an application that sent the second request.

In some embodiments, after the fill operation, read requests, and/or write requests are executed, the priority indicators can be reused and reassigned to subsequent fill operations, read requests, and/or write requests. The processing device can set a limit on the number of priority indicators generated. The limit can be any suitable number and can be dynamically configured to enable efficient request throughput.

Figure 10:
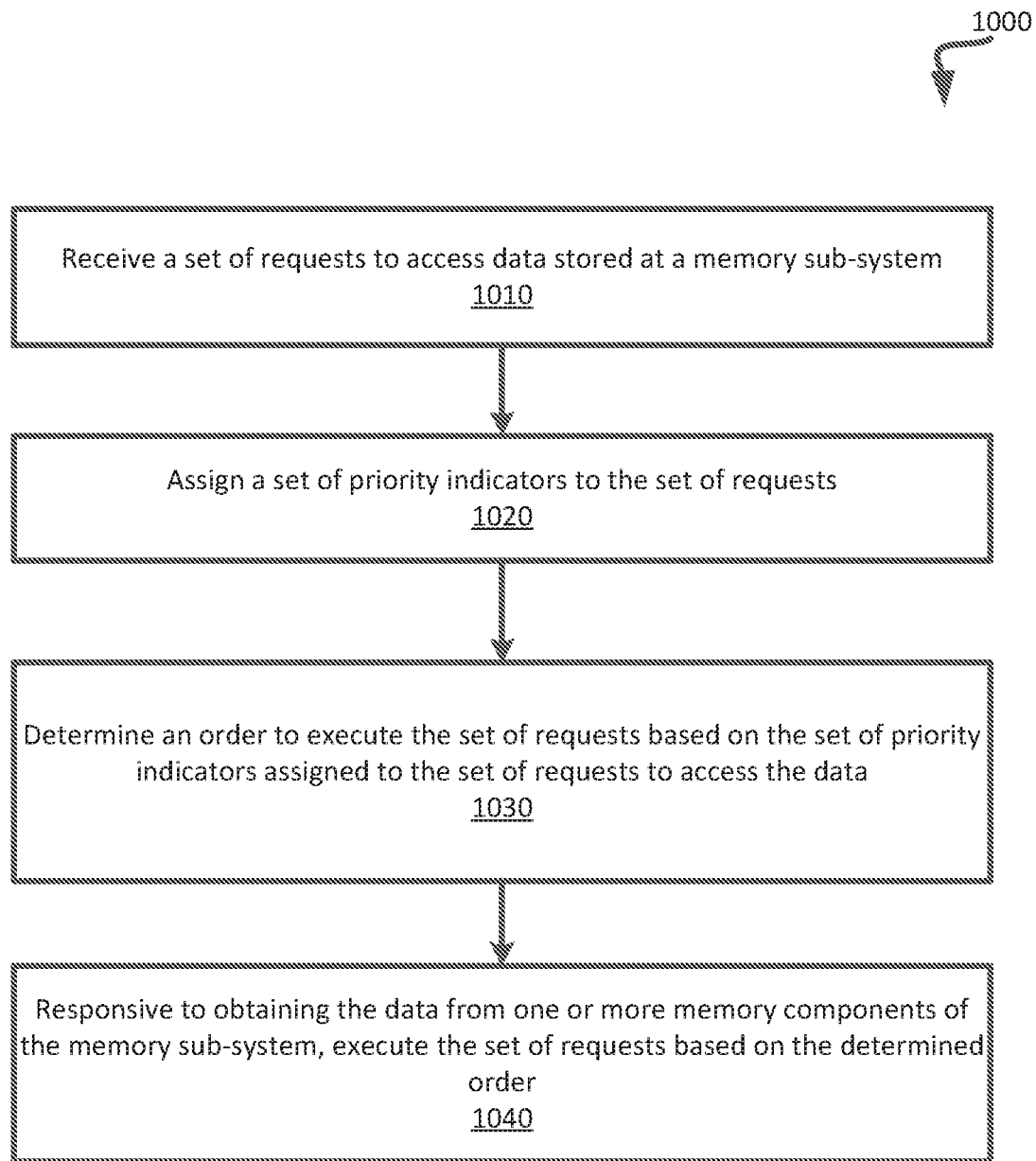
FIG. 10 is a flow diagram of another example method to determine a schedule to execute requests in a memory sub-system in accordance with some embodiments of the present disclosure.

FIG. 10 is a flow diagram of another example method 1000 to determine a schedule to execute requests in a memory sub-system in accordance with some embodiments of the present disclosure. The method 1000 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 1000 is performed by the caching component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 1010, the processing device receives a set of requests to access data stored at a memory sub-system. The set of requests can be received from one or more applications executing on the host system. The requests can include address at which to access the data. If the data included in the set of requests is not present in either the read-only cache or the write-read cache, the processing device determines which one or more outstanding command queues (e.g., read-only or write-read) at which to store the set of requests. If the tag included in the addresses of the set of requests are the same, then the same outstanding command queue can be used to store the set of requests. If the tags included in the addresses of the set of requests are different, then more than one outstanding command queue can be used to store the set of requests. For example, a separate outstanding command queue can be assigned a respective tag.

At operation 1020, the processing device assigns a set of priority indicators to the set of requests. The priority indicators can be generated by the processing device and can include numerical values, for example. The priority indicators can reflect the order in which the set of requests were received by the memory sub-system. The priority indicators can be assigned to the set of requests that are stored in the one or more outstanding command queues. In some instances, when the requests are read requests, there can be fill operations generated that are also assigned priority indicators, as described above.

At operation 1030, the processing device determines an order to execute the set of requests based on the set of priority indicators assigned to the set of requests to access the data. For example, the order can be sequential if the priority indicators are numerical values, such as 1, 2, 3, 4, 5, 6, etc. If there are read requests in the set of requests, the processing device can use a state machine to determine a number of one or more read request for each respect request in the set of requests to read the data based on a size of the cache line in the cache. The processing device can store the one or more read requests in a priority queue based on the order. The processing device can execute the one or more requests stored in the priority queue to read the data from the one or more memory components. The processing device can store a fill operation and the data in a fill queue responsive to obtaining the data from the one or more memory components. The processing device can perform the fill operation to remove the data from the fill queue and store the data in a cache line of a cache of the memory sub-system.

At operation 1040, responsive to obtaining the data from one or more memory components of the memory sub-system, the processing device executes the set of requests based on the determined order. In some embodiments, when there are fill operations stored in the fill queue, the processing device can execute the fill operations prior to executing the read requests corresponding to the fill operations because the priority indicators assigned to fill operations can have higher priority values than the priority indicators assigned to the corresponding read requests.

In some embodiments, a set of second requests to access other data stored at the memory sub-system can be received. The processing device can assign a set of second priority indicators to the set of second requests. The set of second priority indicators can have higher priority values than the set of priority indicators when the other data is obtained from the one or more memory components before the data is obtained from the one or more memory components. The processing device can determine the order to execute the set of requests and the set of second requests based on the set of priority indicators and the set of second priority indicators.

Figure 11:
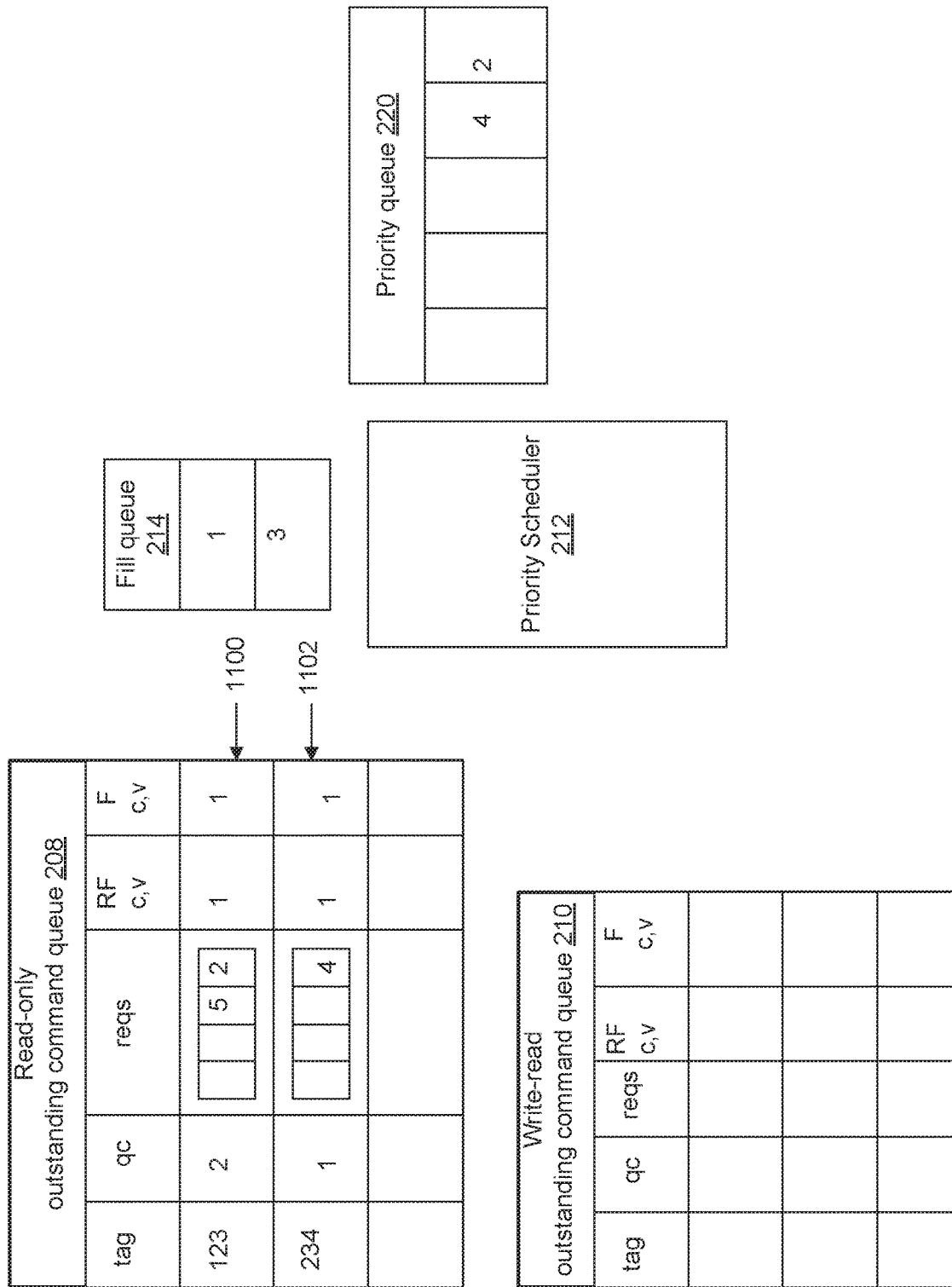
FIG. 11 illustrates an example of using a priority scheduler to determine a schedule to execute requests based on priority indicators in accordance with some embodiments of the present disclosure.

FIG. 11 illustrates an example of using a priority scheduler to determine a schedule to execute requests based on priority indicators in accordance with some embodiments of the present disclosure. In the depicted example, the processing device can determine that the memory access workload for an application includes sequential read requests and that the read-only cache is to be used for read requests received from the application. The processing device can receive a first read requests from the application and search the read-only CAM and the write-read CAM to determine whether the tag of the request is found. If the matching tag is found in either CAM, then the first read request can be sent to the hit queue and the first read request can be processed in the order it is received in the hit queue to return the data to the application. If the matching tag is not found in either CAM, the processing device can determine to use the read-only outstanding command queue 208 because the application is using sequential read requests type of memory access workload.

In the depicted example, the processing device obtained the tag "123" for the first read request and searched the read-only outstanding command queues 208 for a matching tag. The processing device did not find a matching tag and selected entry 1100 to store the first read request. The processing device can set a block bit associated with the read-only outstanding command queue in the request field of entry 1100 to a value indicating the read-only outstanding command queue is blocked (e.g., no requests in the read-only outstanding command queue can be executed while blocked). The processing device can increment the queue counter to "1". The processing device assigned tag "123" to the tag field for the entry 1100. The processing device can determine that a fill operation will be generated for the data associated with the first read request that is returned from the backing store. The priority scheduler 212 can generate priority indicators for the first read request ("2") and the fill operation ("1"). The value of the priority indicator for the fill operation corresponding to the first read request can have a higher priority to enable storing data obtained from the backing store in the cache before performing the first read request. The priority scheduler 212 can assign the priority indicator "2" to the first read request in the outstanding command queue in the requests field of the entry 1100. The processing device can also increment the read-from counter to "1" and the fill counter to "1", as depicted.

The processing device can receive a second read request including a tag "234" and can search the read-only outstanding command queues 208 for a matching tag. The processing device did not find a matching tag in the read-only outstanding command queues 208 and selected entry 1102 to store the second read request. The processing device can set a block bit associated with the read-only outstanding command queue in the request field of entry 1102 to a value indicating the read-only outstanding command queue is blocked (e.g., no requests in the read-only outstanding command queue can be executed while blocked). The processing device assigned the tag "234" to the tag field in the entry 1102. The priority scheduler 212 can determine that a fill operation will be generated for the data associated with the second read request that is returned from the backing store. The priority scheduler 212 can generate priority indicators for the second read request ("4") and the fill operation ("3"). The priority scheduler 212 can assign the priority indicator ("4") to the second read request in the outstanding command queue in the requests field of the entry 1102.

The processing device can receive a third read request including the tag "123" and can search the read-only outstanding command queues 208 for a matching tag. The processing device found the matching tag "123" in the entry 1100. As such, the processing device can store the third read request in the read-only outstanding command queue in the request field of the entry 1100. The processing device can increment the queue counter to "2", as depicted. The priority scheduler 212 can determine that a fill operation is already going to be generated for the data associated with the second read request having the tag "123" so another fill operation does not need to be generated and assigned a priority indicator. The priority scheduler 212 can generate a priority indicator for just the third read request ("5") and can assign the priority indicator "5" to the third read request in the outstanding command queue in the requests field of the entry 1100.

The priority scheduler 212 can use the priority queue 220 to store the read requests and execute the read requests in the order in which the read requests are stored to obtain data from the backing store. As depicted, the first read request assigned priority indicator "2" is stored in the priority queue 220 first and the second read request assigned priority indicator "4" is stored in the priority queue 220 second because its priority indicator has a lesser priority value than the first read request. Further, the third read request may not be stored in the priority queue 220 because the first read request having the same tag can obtain the data from the backing store at the address corresponding to the same tag.

The processing device can perform the first read request to obtain the data corresponding to the tag "123" from the backing store. After performing the first read request, the processing device can decrement the read-from counter to "0" in the entry 1100. A first fill operation for the data obtained from the first read request can be generated and stored in the fill queue 214 with the data obtained from the backing store. The priority scheduler 212 can assign the priority indicator "1" to the first fill operation corresponding to the first read request.

The processing device can perform the second read request to obtain the data corresponding to the tag "234" from the backing store. After performing the second read request, the processing device can decrement the read-from counter to "0" in the entry 1102. A second fill operation for the data obtained from the second read request can be generated and stored in the fill queue 214 with the data obtained from the backing store. The priority scheduler 212 can assign the priority indicator "3" to the second fill operation corresponding to the second read request.

The priority scheduler 212 can determine a schedule for executing the read requests and the fill operations based on the priority indicators assigned to the read requests and the fill operations. The schedule can be sequential based on the numerical values. In one example, the schedule is execute the first fill operation having priority indicator "1", the first read request having priority indicator "2", the second fill operation having priority indicator "3", the second read request having priority indicator "4", and the third read request having priority indicator "5".

The processing device can perform the first fill operation by removing the data from the fill queue 214 and storing the data to a cache line corresponding to the tag "123" in the read-only cache. The processing device can decrement the fill counter to "0" in entry 1100. The priority scheduler 212 can obtain the priority indicator "1" and reuse it for subsequent read requests and/or fill operations. The processing device can unblock the read-only outstanding command queue by setting a value of a block bit associated with the read-only outstanding command queue to a value indicating an unblocked state. The processing device can execute the first read request having the next priority indicator "2" while the outstanding command queue in the entry 1100 is unblocked to return the data from the cache line corresponding to tag "123" to the application that sent the first read request. The processing device can decrement the queue counter to "1". The priority scheduler 212 can obtain the priority indicator "2" and reuse it for subsequent read requests and/or fill operations.

The processing device can search for the read request or the fill operation having the next priority indicator (e.g., "3") and can determine that the second fill operation is assigned the next priority indicator. The second fill operation can be assigned the next priority instead of the third read request because the second read request associated with the second fill operation was received before the third read request. The processing device can set the block bit corresponding to the read-only outstanding command queue to a value indicating a blocked state to prevent the third read request from executing.

The processing device can perform the second fill operation by removing the data from the fill queue 214 and storing the data to a cache line corresponding to the tag "234" in the read-only cache. The processing device can decrement the fill counter in the entry 1102. The priority scheduler 212 can obtain the priority indicator "3" and reuse it for subsequent read requests and/or fill operations. The processing device can unblock the read-only outstanding command queue by setting a value of a block bit associated with the read-only outstanding command queue to a value indicating an unblocked state. The processing device can execute the second read request having the next priority indicator "4" while the outstanding command queue in the entry 1100 is unblocked to return the data at the cache line corresponding to the tag "234" to the application that sent the second read request. The priority scheduler 212 can obtain the priority indicator "4" and reuse it for subsequent read requests and/or fill operations. The queue counter of entry 1102 can be decremented to "0" after the second read request is performed.

The processing device can search for the next priority indicator "5", which is assigned to the third read request. The processing device can set the block bit associated with the outstanding command queue of entry 1100 to an unblocked state. The processing device can execute the third read request while the outstanding command queue of entry 1100 is unblocked to return data at the cache line corresponding to tag "123" to the application that sent the third request. The priority scheduler 212 can obtain the priority indicator "5" and reuse it for subsequent read requests and/or fill operations. The queue counter of entry 1100 can be decremented to "0" after the third read request is performed.

As can be appreciated, the requests can be performed out-of-order between outstanding command queues that correspond to different cache lines. For example, the first read request having priority indicator "2" was performed in the queue of entry 1100, the second read request having priority indicator "4" was performed in the queue of entry 1102, and then the third read request having priority indicator "5" was performed in the queue of entry 1100. This can provide the benefit of improved quality of service so applications do not have to wait on other requests to complete execution before receiving requested data if the requested data is available. Also, the requests can be performed in-order based on when the requests are received for the same cache line. As depicted, the third request was received after the first request to read data from the cache line corresponding to the same tag and the third request is stored after the first request in the queue. Using a first-in, first-out outstanding command queue can ensure the requests are processed in the order in which they are received.

Figure 12:
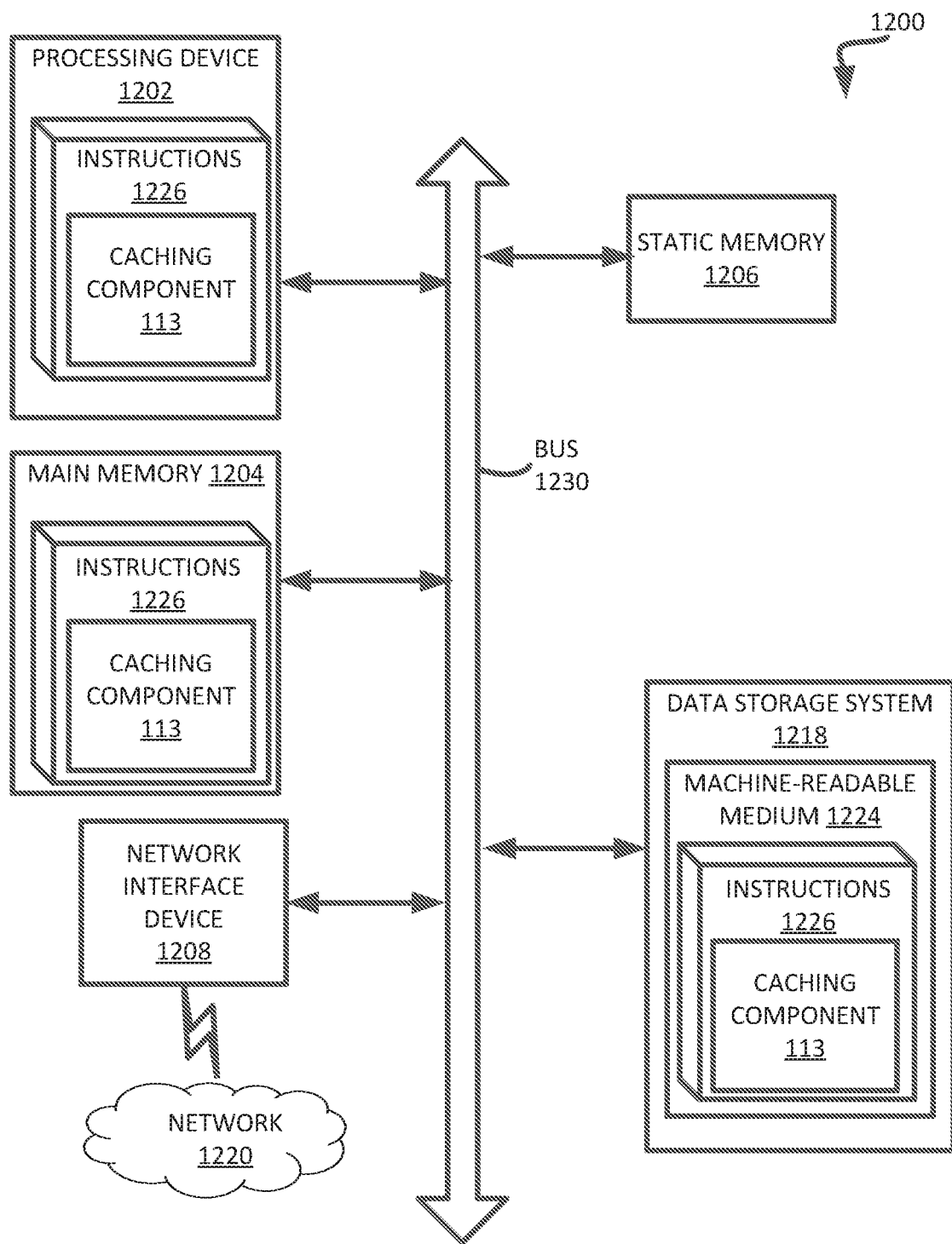
FIG. 12 is a block diagram of an example computer system in which embodiments of the present disclosure may operate.

FIG. 12 illustrates an example machine of a computer system 1200 within which a set of instructions, for causing the machine to perform any one or more of the methodologies discussed herein, can be executed. In some embodiments, the computer system 1200 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the caching component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1200 includes a processing device 1202, a main memory 1204 (e.g., read-only memory (ROM), flash memory, dynamic random access memory (DRAM) such as synchronous DRAM (SDRAM) or Rambus DRAM (RDRAM), etc.), a static memory 1206 (e.g., flash memory, static random access memory (SRAM), etc.), and a data storage system 1218, which communicate with each other via a bus 1230.

Processing device 1202 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1202 can also be one or more special-purpose processing devices such as an application specific integrated circuit (ASIC), a field programmable gate array (FPGA), a digital signal processor (DSP), network processor, or the like. The processing device 1202 is configured to execute instructions 1226 for performing the operations and steps discussed herein. The computer system 1200 can further include a network interface device 1208 to communicate over the network 1220.

The data storage system 1218 can include a machine-readable storage medium 1224 (also known as a computer-readable medium) on which is stored one or more sets of instructions 1226 or software embodying any one or more of the methodologies or functions described herein. The instructions 1226 can also reside, completely or at least partially, within the main memory 1204 and/or within the processing device 1202 during execution thereof by the computer system 1200, the main memory 1204 and the processing device 1202 also constituting machine-readable storage media. The machine-readable storage medium 1224, data storage system 1218, and/or main memory 1204 can correspond to the memory sub-system 110 of FIG. 1.

In one embodiment, the instructions 1226 include instructions to implement functionality corresponding to a caching component (e.g., the caching component 113 of FIG. 1). While the machine-readable storage medium 1224 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
   receiving a request to read data stored at a memory sub-system;
   determining whether the data is stored at a cache of the memory sub-system;
   responsive to determining that the data is not stored at the cache of the memory sub-system, obtaining the data from a memory component of the memory sub-system;
   assigning a first priority indicator to a fill operation associated with the data that is obtained from the memory component;
   storing the fill operation and the data that is obtained from the memory component in a fill queue;
   assigning a second priority indicator to the request to read the data; and
   determining, by a processing device, a schedule of executing the fill operation from the fill queue and the request to read the data based on the first priority indicator and the second priority indicator.

2. The method of claim 1, further comprising storing the request in a queue corresponding to an address associated with the data.

3. The method of claim 2, further comprising:
   receiving a second request to read the data stored at the memory sub-system;
   determining whether an identifier associated with the second request to read the data is assigned to the queue;
   responsive to determining that the identifier associated with the second request to read the data is assigned to the queue:
      assigning a third priority indicator to the second request; and
      storing the second request in the queue.

4. The method of claim 3, further comprising:
   receiving a third request to write other data to the address associated with the data at the memory sub-system;
   determining whether another identifier associated with the third request to write other data is assigned to the queue;
   responsive to determining that the identifier associated with the third request to write other data is assigned to the queue:
      assigning a fourth priority indicator to the third request; and
      storing the third request in the queue.

5. The method of claim 4, further comprising determining a schedule of executing the fill operation, the request to read the data, the second request to read the data, and the third request to write the other data based on the first priority indicator, the second priority indicator, the third priority indicator, and the fourth priority indicator, wherein the schedule reflects an order in which the request, the second request, and the third request have been received.

6. The method of claim 1, further comprising:
   receiving a second request to read other data stored at the memory sub-system;
   determining whether the other data is stored at the cache of the memory sub-system;
   responsive to determining that the other data is not stored at the cache of the memory sub-system, obtaining the other data from the memory component of the memory sub-system;
   assigning a third priority indicator to a second fill operation associated with the other data that is obtained from the memory component;
   assigning a fourth priority indicator to the second request to read the other data; and
   determining a schedule of executing the fill operation, the request to read the data, the second fill operation, and the second request to read the other data based at least on the first priority indicator, the second priority indicator, the third priority indicator, and the fourth priority indicator.

7. The method of claim 6, further comprising executing, based on the determined schedule, the request to read the data and the second request to read the other data in a different order than in which the request to read the data and the second request to read the other data have been received.

8. The method of claim 1, further comprising storing the data in the cache and executing the request to read the data to provide the data stored in the cache to a host system based on the determined schedule.

9. The method of claim 1, further comprising responsive to executing the fill operation and the request to read the data, reassigning the first priority indicator and the second priority indicator to a second fill operation associated with other data and a second request to read the other data.

10. A system, comprising:
    a memory device;
    a processing device, operatively coupled with the memory device, to:
       receive a request to read data stored at the system;
       determine whether the data is stored at a cache of the system
       responsive to determining that the data is not stored at the cache of the system, obtain the data from the memory device;
       assign a first priority indicator to a fill operation associated with the data that is obtained from the memory device;
       store the fill operation and the data that is obtained from the memory device in a fill queue;
       assign a second priority indicator to the request to read the data; and
       determine a schedule of executing the fill operation from the fill queue and the request to read the data based on the first priority indicator and the second priority indicator.

11. The system of claim 10, wherein the processing device is further to:
receive a second request to read the data stored at the system;
determine whether an identifier associated with the second request to read the data is assigned to a queue;
responsive to determining that the identifier associated with the second request to read the data is assigned to the queue:
assign a third priority indicator to the second request; and
store the second request in the queue.

12. The system of claim 11, wherein the processing device is further to:
receive a third request to write other data to the address associated with the data at the system;
determine whether an identifier associated with the third request to write other data is assigned to the queue;
responsive to determining that the identifier associated with the third request to write other data is assigned to the queue:
assign a fourth priority indicator to the request; and
store the third request in the queue.

13. The system of claim 12, wherein the processing device is further to determine a schedule of executing the fill operation, the request to read the data, the second request to read the data, and the third request to write the other data based on the first priority indicator, the second priority indicator, the third priority indicator, and the fourth priority indicator, wherein the schedule reflects an order in which the request, the second request, and the third request have been received.

14. The system of claim 10, wherein the processing device is further to:
receive a second request to read other data stored at the system;
determine whether the other data is stored at the cache of the system;
responsive to determining that the other data is not stored at the cache of the system, obtain the other data from the memory device;
assign a third priority indicator to a second fill operation associated with the other data that is obtained from the memory device;
assign a fourth priority indicator to the second request to read the other data; and
determine a schedule of executing the fill operation, the request to read the data, the second fill operation, and the second request to read the other data based at least on the first priority indicator, the second priority indicator, the third priority indicator, and the fourth priority indicator.

15. The system of claim 14, wherein the processing device is further to execute, based on the determined schedule, the request to read the data and the second request to read the other data in a different order than in which the request to read the data and the second request to read the other data have been received.

16. A method comprising:
receiving a plurality of requests to access data stored at a memory sub-system;
assigning a plurality of priority indicators to the plurality of requests and to one or more fill operations associated with the data;
determining, by a processing device, an order to execute the plurality of requests and the one or more fill operations based on the plurality of priority indicators assigned to the plurality of requests to access the data; and
responsive to obtaining the data from one or more memory components of the memory sub-system, storing the one or more fill operations and the data in a fill queue and executing the plurality of requests and the one or more fill operations based on the determined order.

17. The method of claim 16, further comprising:
receiving a plurality of second requests to access other data stored at the memory sub-system;
assigning a plurality of second priority indicators to the plurality of second requests, wherein the plurality of second priority indicators have higher priority values than the plurality of priority indicators when the other data is obtained from the one or more memory components before the data is obtained from the one or more memory components; and
determining the order to execute the plurality of requests and the plurality of second requests based on the plurality of priority indicators and the plurality of second priority indicators.

18. The method of claim 16, wherein obtaining the data from the one or more memory components of the memory sub-system comprises:
storing the one or more requests to read the data from the memory component in a priority queue based on the order;
executing the one or more requests stored in the priority queue to read the data from the one or more memory components; and
performing the one or more fill operations to remove the data from the fill queue and store the data in a cache line of a cache of the memory sub-system.

19. The method of claim 18, wherein determining a number of the one or more requests required to read the data based on a size of the cache line that the data is stored in the cache of the memory sub-system.

* * * * *